(12) United States Patent
Jang et al.

(10) Patent No.: US 6,401,002 B1
(45) Date of Patent: Jun. 4, 2002

(54) LAYER MANUFACTURING APPARATUS AND PROCESS

(75) Inventors: Justin Jang; Wen C. Huang, both of Auburn, AL (US); Weiltong Zhong, Beijing (CN)

(73) Assignee: Nanotek Instruments, Inc., Opelika, AL (US)

( * ) Notice: Subject to any disclaimer, the term of this patent is extended or adjusted under 35 U.S.C. 154(b) by 0 days.

(21) Appl. No.: 09/302,247

(22) Filed: Apr. 29, 1999

(51) Int. Cl.$^7$ .............................................. G06F 19/00
(52) U.S. Cl. .................... 700/119; 700/118; 700/98; 700/120; 700/163; 264/401; 264/512; 264/516; 427/466; 427/470; 427/472; 204/192.15; 204/192.2; 204/298.12
(58) Field of Search ............................ 700/98, 97, 117, 700/118, 119, 163; 345/419, 420; 264/401, 633, 642, 75, 304; 427/466, 472, 470, 249.14, 248.1, 255.4, 595, 553; 204/192.2, 192.26, 192.3, 298.2, 192.5

(56) References Cited

U.S. PATENT DOCUMENTS

| | | | |
|---|---|---|---|
| 4,665,492 A | | 5/1987 | Masters |
| 4,749,347 A | | 6/1988 | Valavaara |
| 4,863,538 A | | 9/1989 | Deckard |
| 5,015,312 A | | 5/1991 | Kinzie |
| 5,059,266 A | | 10/1991 | Yamane et al. |
| 5,121,329 A | | 6/1992 | Crump |
| 5,134,509 A | | 7/1992 | Masters |
| 5,204,055 A | | 4/1993 | Sachs et al. |
| 5,301,863 A | | 4/1994 | Prinz |
| 5,303,141 A | | 4/1994 | Batchelder |
| 5,340,656 A | | 8/1994 | Sachs et al. |
| 5,387,380 A | | 2/1995 | Cima et al. |
| 5,402,351 A | | 3/1995 | Batchelder |
| 5,490,882 A | | 2/1996 | Sachs et al. |
| 5,506,607 A | | 4/1996 | Sanders et al. |
| 5,514,232 A | | 5/1996 | Burns |
| 5,555,481 A | | 9/1996 | Rock et al. |
| 5,637,175 A | * | 6/1997 | Feygin et al. ............... 156/264 |
| 5,669,433 A | * | 9/1997 | Sterett et al. .................. 164/46 |
| 5,738,817 A | * | 4/1998 | Danforth et al. ............ 264/603 |
| 5,740,051 A | | 4/1998 | Sanders et al. |
| 5,814,265 A | * | 9/1998 | Hull ............................ 264/401 |
| 5,879,489 A | * | 3/1999 | Burns et al. ................... 156/64 |
| 5,934,343 A | * | 8/1999 | Gaylo et al. .................. 141/12 |
| 6,129,872 A | * | 10/2000 | Jang ............................. 264/75 |
| 6,165,406 A | * | 12/2000 | Jang et al. ................... 264/308 |
| 6,214,279 B1 | * | 4/2001 | Yang et al. .................. 264/482 |
| 6,243,616 B1 | * | 6/2001 | Droscher et al. ........... 700/118 |

* cited by examiner

Primary Examiner—Ramesh Patel

(57) ABSTRACT

A solid freeform fabrication process and apparatus for making a three-dimensional object. The process comprises the steps of (1) operating a multiple-channel material deposition sub-system for dispensing droplets of selected liquid compositions and solid powders at predetermined proportions; (2) providing an object platform in close working vicinity to the deposition sub-system to receive the deposition materials therefrom; and (3) during the material deposition process, moving the deposition sub-system and the platform relative to each other in an X-Y plane defined by first and second directions and in a Z direction orthogonal to the X-Y plane so that the materials are deposited to form a first layer of the object. These steps are repeated to deposit multiple layers for forming a three-dimensional shape. These steps are preferably executed under the control of a computer system by taking additional steps of (4) creating an image of the object on the computer with the image including a plurality of segments defining the object and each segment being preferably coded with a color and/or a material composition; (5) generating programmed signals corresponding to each of the segments in a predetermined sequence; and (6) moving the deposition sub-system and the platform relative to each other in response to said programmed signals. Preferably, the system is also operated to generate a support structure for any unsupported feature of the object.

21 Claims, 10 Drawing Sheets

LAYER MANUFACTURING APPARATUS AND PROCESS

FIELD OF THE INVENTION

This invention relates generally to a computer-controlled object-building process and apparatus and, in particular, to an improved process and apparatus for building a three-dimensional object in a layer-by-layer fashion.

BACKGROUND OF THE INVENTION

Solid freeform fabrication (SFF) or layer manufacturing is a new rapid prototyping technology that builds an object layer by layer or point by point. This process begins with creating a Computer Aided Design (CAD) file to represent the image or drawing of a desired object. As a common practice, this CAD file is converted to a stereo lithography (.STL) format in which the exterior and interior surfaces of the object is approximated by a large number of triangular facets that are connected in a vertex-to-vertex manner. A triangular facet is represented by three vertex points each having three coordinate points: $(x_1,y_1,z_1,)$, $(x_2,y_2,z_2)$, and $(x_3,y_3,z_3)$. A perpendicular unit vector $(i,j,k)$ is also attached to each triangular facet to represent its normal for helping to differentiate between an exterior and an interior surface. This object image file is further sliced into a large number of thin layers with the contours of each layer being defined by a plurality of line segments connected to form polylines. The layer data are converted to tool path data normally in terms of computer numerical control (CNC) codes such as G-codes and M-codes. These codes are then utilized to drive a fabrication tool for building an object layer by layer.

This SFF technology enables direct translation of the CAD image data into a three-dimensional (3-D) object. The technology has enjoyed a broad array of applications such as verifying CAD database, evaluating design feasibility, testing part functionality, assessing aesthetics, checking ergonomics of design, aiding in tool and fixture design, creating conceptual models and sales/marketing tools, generating patterns for investment casting, reducing or eliminating engineering changes in production, and providing small production runs.

A commercially available system, fused deposition modeling (FDM) from Stratasys, Inc. (Minneapolis, Minn.), operates by employing a heated nozzle to melt and extrude out a nylon wire or wax rod. The starting material is in the form of a rod or filament that is driven by a motor and associated rollers to move like a piston. The front end, near a nozzle tip, of this piston is heated to become melted; the rear end or solid portion of this piston pushes the melted portion forward to exit through the nozzle tip. The nozzle is translated under the control of a computer system in accordance with previously sliced CAD data. The FDM technique was first disclosed in U.S. Pat. No. 5,121,329 (1992), entitled "Apparatus and Method for Creating Three-Dimensional Objects," issued to S. S. Crump. A more recent patent (U.S. Pat. No. 5,738,817, April 1998, to Danforth, et al.) reveals a fused deposition process for forming 3-D solid objects from a mixture of a particulate composition dispersed in a binder. The binder is later burned off with the remaining particulate composition densified by re-impregnation or high-temperature sintering. Other melt extrusion-type processes include those disclosed in Valavaara (U.S. Pat. No. 4,749,347, June 1988), Masters (U.S. Pat. No. 5,134,569, July 1992), and Batchelder, et al. (U.S. Pat. No. 5,402,351, 1995 and U.S. Pat. No. 5,303,141, 1994). These melt extrusion based deposition systems are known to provide a relatively poor part accuracy. For instance, a typical FDM system provides an extruded strand of 250 to 500 $\mu$m, although a layer accuracy as low as 125 $\mu$m is achievable. The accuracy of a melt extrusion rapid prototyping system is limited by the orifice size of the extrusion nozzle, which cannot be smaller than approximately 125 $\mu$m in real practice. Otherwise, there would be excessively high flow resistance in an ultra-fine capillary channel. Such a system, however, can provide a relatively fast deposition rate provided a larger-diameter nozzle orifice is utilized.

In U.S. Pat. No. 4,665,492, issued May 12, 1987, Masters teaches part fabrication by spraying liquid resin droplets, a process commonly referred to as Ballistic Particle Modeling (BPM). The BPM process includes heating a supply of thermoplastic resin to above its melting point and pumping the liquid resin to a nozzle, which ejects small liquid droplets from different directions to deposit on a substrate. Sanders Prototype, Inc. (Merrimack, N.H.) provides inkjet print-head technology for model making. Multiple-inkjet based rapid prototyping systems are available from 3D Systems, Inc. (Valencia, Calif.). Inkjet printing involves ejecting fine polymer or wax droplets from a print-head nozzle that is either thermally activated or piezo-electrically activated. The droplet size typically lies between 30 and 50 $\mu$m, but could go down to 13 $\mu$m. This implies that inkjet printing offers a high part accuracy. However, building an object point-by-point with "points" or droplets as small as 13 $\mu$m could mean a slow build rate.

In a series of U.S. patents (U.S. Pat. No. 5,204,055, April 1993, U.S. Pat. No. 5,340,656, August 1994, U.S. Pat. No. 5,387,380, February 1995, and U.S. Pat. No. 5,490,882, February 1996), Sachs, et al. disclose a 3-D printing technique that involves using an ink jet to spray a computer-defined pattern of liquid binder onto a layer of uniform-composition powder. The binder serves to bond together those powder particles on those areas defined by this pattern. Those powder particles in the un-wanted regions remain loose or separated from one another and are removed at the end of the build process. Another layer of powder is spread over the preceding one, and the process is repeated. The "green" part made up of those bonded powder particles is separated from the loose powder when the process is completed. This procedure is followed by binder removal and metal melt impregnation or sintering. Again, ejection of fine liquid droplets to bond a large area of powder particles could mean a long layer-building time.

The selected laser sintering or SLS technique (e.g., U.S. Pat. No. 4,863,538) involves spreading a full-layer of powder particles and uses a computer-controlled, high-power laser to partially melt these particles at desired spots. Commonly used powders include thermoplastic particles or thermoplastic-coated metal and ceramic particles. The procedures are repeated for subsequent layers, one layer at a time, according to the CAD data of the sliced-part geometry. The loose powder particles in each layer are allowed to stay as part of a support structure. The sintering process does not always fully melt the powder, but allows molten material to bridge between particles. Commercially available systems based on SLS are known to have several drawbacks. One problem is that long times are required to heat up and cool down the material chamber after building. In addition, the resulting part has a porous structure and subsequent sintering or infiltration operations are needed to fully consolidate the part.

U.S. Pat. No. 5,555,481, issued on Sep. 10, 1996 to Rock and Gilman, discloses a powder-based layer manufacturing method that is capable of creating parts with spatially controlled material compositions. This technique involves producing parts using two distinct classes of materials. According to this method, a first class material and a second class material are deposited on a surface wherein the first class material forms a three-dimensional shape defined by the interface between the first class material and the second class material. The first class material is unified by subsequent processing such as sintering or fusion-and-solidification, which is followed by removing the second class material from the three-dimensional part made up of first class material. The second class material plays the basic role of serving as a support structure. Upon completion of the deposition procedure for all layers, the green object which has been compacted but not yet unified is highly delicate and fragile, prone to shape changes during subsequent handling. The final unification procedure tends to involve dimensional or shape changes in a part, thereby compromising the part accuracy. For instance, sintering of ceramic or metallic particles is known in the field of powder technology to involve large shrinkage. Solidification of a crystalline material (polymer, metal, and ceramic) from the melt state to the solid state are normally attendant with a large volume change. Since these geometry changes are allowed to occur at the end of the part building process, it is extremely difficult to exercise any corrective action to ensure the part accuracy.

Most of the prior-art layer manufacturing techniques have been largely limited to producing parts with homogeneous material compositions. Furthermore, due to the specific solidification mechanisms employed, many other techniques are limited to producing parts from specific polymers. For instance, Stereo Lithography and Solid Ground Curing (SGC) rely on ultraviolet (UV) light induced curing of photo-curable polymers such as acrylate and epoxy resins. The SGC system uses UV-curable acrylate photo polymer and a photo-masking technique. A mask generator produces a negative image of the desired layer cross-section on a glass mask plate. A thin layer of liquid photo polymer is spread across the object-supporting platform and a strong UV light is allowed to pass through the transparent portions of the mask to selectively cure the polymer in these desired regions. Uncured resin is then removed by a vacuum cleaner and wax is spread across the layer to fill in any gaps (left behind by the removed resin, for instance). After the wax is solidified it is then machined flat to provide support for the cured resin. A major disadvantage of this technique is that it produces excessive waste of resin and wax. Additionally, the system requires attended operation and is, therefore, not considered to be a fully automated fabrication technique.

Either droplet deposition or melt extrusion method alone does not meet the two critical requirements imposed upon a rapid prototyping (RP) system: speed and accuracy. For instance, liquid droplet ejection features high accuracy but low speed, while melt extrusion features relatively higher speed but much lower accuracy.

Additionally, most of the current RP systems are not effective in varying the colors of an object from layer to layer and from spot to spot. In principle, a melt extrusion system can change the color of an extruded strand of liquid by feeding a material with a different color. But, it would take a relatively long time for an extrusion device to dispense the new color material after a new color is added. The extruder chamber and nozzle have a channel of finite length in which undesirable mixing of colors can occur. Color adjustments can be made much more readily with droplet deposition methods. Two-dimensional color inkjet printing is now commonplace. Color inkjet printers are found in an ever-increasing number of homes and offices worldwide. However, rapid prototyping technology developers have not taken full advantage of color printing technology. The current droplet deposition based RP systems still lack the capability to freely adjust the color so that an object with a desired color pattern can be made under the control of a computer. Yamane, et al. (U.S. Pat. No. 5,059,266, October 1991 and U.S. Pat. No. 5,140,937, August 1992) disclose a droplet jetting system for fabricating 3-D objects from photosetting or thermosetting resins. Droplet jetting from other types of material was not addressed in these two patents. The possible need to build a support structure for any un-supported feature in a given object was overlooked.

In U.S. Pat. No. 5,015,312, issued May 14, 1991, Kinzie discloses a method and apparatus for constructing a 3-D "surface" of predetermined shape and color from a length of sheet material. This method begins by making a series of color profiles along one side (top or bottom surface, but not the edge) of the sheet material in sequence. Each color profile corresponds in shape and color to the shape and color of a different cross section of the surface to be constructed. Areas on the sheet material outside of the profiles are then removed and discarded so as to leave a series of unconnected planar elements. Each planar element has an edge shape or outline corresponding to a cross-section of the surface with the color profile itself forming at least a color border or margin on the surface of its respective planar element around the edge. These individual planar elements are then glued together in a proper sequence to form a "laminated" structure. When viewed, the entire surface of this structure appears to be colored even though the color is applied only along one side (top or bottom surface, but not along the edges) of individual planar elements. This method does provide a variable multi-color exterior surface of an object. This layer-subtractive method, however, pays little attention to the formation of interior features (e.g., shape and dimension of a channel) of a 3-D object. A useful prototype requires the formation of more than just its outside surface. Further, the final stacking-up and lamination procedures must be carried out manually and the creation of color profiles on each layer is a lengthy procedure. Hence, this process is expected to be slow and labor intensive. Furthermore, since colors do not appear on the edge surface of a cross section, any portion of the structure composed of uniform-cross section layers will not exhibit a desirable color perception.

In U.S. Pat. No. 5,514,232, issued May 7, 1996, Burns discloses a method and apparatus for automatic fabrication of a 3-D object from individual layers of fabrication material having a predetermined configuration. Each layer of fabrication material is first deposited on a carrier substrate in a deposition station. The fabrication material along with the substrate are then transferred to a stacker station. At this stacker station the individual layers are stacked together, with successive layers being affixed to each other and the substrate being removed after affixation. One advantage of this method is that the deposition station may permit deposition of layers with variable colors or material compositions. In real practice, however, transferring a delicate, not filly consolidated layer from one station to another would tend to shift the layer position and distort the layer shape. The removal of individual layers from their substrate also tends to inflict changes in layer shape and position with respect to a previous layer, leading to inaccuracy in the resulting part.

In U.S. Pat. No. 5,301,863 issued on Apr. 12, 1994, Prinz and Weiss disclose a Shape Deposition Manufacturing (SDM) system. The system contains a material deposition station and a plurality of processing stations (for mask making, heat treating, packaging, complementary material deposition, shot peening, cleaning, shaping, sand-blasting, and inspection). Each processing station performs a separate function such that when the functions are performed in series, a layer of an object is produced and is prepared for the deposition of the next layer. This system requires an article transfer apparatus, a robot arm, to repetitively move the object-supporting platform and any layers formed thereon out of the deposition station into one or more of the processing stations before returning to the deposition station for building the next layer. These additional operations in the processing stations tend to shift the relative position of the object with respect to the object platform. Further, the transfer apparatus may not precisely bring the object to its exact previous position. Hence, the subsequent layer may be deposited on an incorrect spot, thereby compromising part accuracy. The more processing stations that the growing object has to go through, the higher the chances are for the part accuracy to be lost. Such a complex and complicated process necessarily makes the over-all fabrication equipment bulky, heavy, expensive, and difficult to maintain. The equipment also requires attended operation.

Therefore, an object of the present invention is to provide a layer-additive process and apparatus for producing an object with improved build rate and part accuracy.

Another object of the present invention is to provide a computer-controlled process and apparatus for producing a multi-color 3-D object on a layer-by-layer basis.

It is a further object of this invention to provide a computer-controlled object-building process that does not require heavy and expensive equipment.

It is another object of this invention to provide a process and apparatus for building a CAD-defined object in which the color pattern can be predetermined.

Still another object of this invention is to provide a layer manufacturing technique that places minimal constraint on the range of materials that can be used in the fabrication of a 3-D object.

SUMMARY OF THE INVENTION

The Process

The objects of the invention are realized by a process and related apparatus for fabricating a three-dimensional object on a layer-by-layer basis. Basically, the process comprises co-deposition of ejected liquid droplets and solid powder particles at predetermined proportions to build an object, preferably under the control of a CAD computer. Both liquid droplets and solid powders can be selected from a wide range of materials. Liquid droplets may also contain desired color dyes for building a multi-color object.

One embodiment of the present invention is a process for building a 3-D object in a layer-by-layer fashion. The process comprises the steps of:

(a) operating a material deposition sub-system which comprises (1) a multiple-channel droplet deposition device for supplying multiple liquid compositions and ejecting droplets of selected liquid compositions on demand and (2) a powder dispensing device to deposit fine solid particles on demand so that the deposited liquid droplets and solid particles are well mixed at predetermined proportions;

(b) providing an object-supporting platform in a close working vicinity of the material deposition sub-system to receive the liquid droplets and solid powder particles therefrom; and (c) during the droplet ejecting and powder dispensing process, moving the material deposition sub-system and the object platform relative to one another in an X-Y plane defined by first (X-) and second (Y-) directions and in a third or Z-direction orthogonal to the X-Y plane to form the liquid droplets and solid particles (collectively referred to as deposition materials) into a three dimensional object. Liquid compositions may comprise selected dyes or colorants when making a colored object.

Different channels may supply different liquid compositions; e.g., different types of material, dyes, and other additives. The powder dispensing device preferably is also capable of depositing solid particles of variable compositions. Such a device, therefore, may also be multi-channeled.

In another embodiment, a process is disclosed which comprises the above three steps, (a) through (c), wherein the moving step includes the steps of (i) moving the deposition sub-system and the platform relative to each other in a direction parallel to the X-Y plane to form a first layer of the deposition materials on the platform; (ii) moving the deposition sub-system and the platform away from one another by a predetermined layer thickness; and (iii) after the portion of the first layer adjacent to the nozzles of the deposition sub-system has solidified, dispensing a second layer of the deposition materials onto the first layer while simultaneously moving the platform and the deposition sub-system relative to each other in a direction parallel to the X-Y plane, whereby the liquid droplets in the second layer solidifies and adheres to the first layer.

In yet another embodiment, a process is disclosed which comprises the above steps, (a) through (c) including (i) through (iii), and additional steps of (e) forming multiple layers of the deposition materials on top of one another by repeated dispensing of the liquid droplets and powder particles from the deposition devices as the platform and the deposition sub-system are moved relative to each other in a direction parallel to the X-Y plane, with the deposition sub-system and the platform being moved away from one another in the Z-direction by a predetermined layer thickness after each preceding layer has been formed, and with the dispensing of each successive layer being controlled to take place after the liquid material in the preceding layer immediately adjacent the deposition sub-system has substantially solidified.

As a further preferred embodiment, the above cited steps (a) through (c) are further combined with the steps of (f) creating an image of the three-dimensional object on a computer with the image including a plurality of segments defining the object; (g) generating programmed signals corresponding to each of the segments in a predetermined sequence; and (h) moving the deposition sub-system and the platform relative to each other in response to the programmed signals. To build a colorful object, each segment is preferably attached with a color code that can be converted to programmed signals for activating the ejection of selected ink-containing liquid compositions to form the desired color pattern of the finished object. Further preferably, the supporting software programs in the computer comprise means for evaluating the CAD data files of the object to locate any un-supported feature of the object and means for defining a support structure for the un-supported feature. The software is also capable of creating a plurality of segments defining the support structure and generating programmed signals required by the same deposition device or a separate fabrication tool to fabricate the support structure.

As another preferred embodiment, the surface areas (exterior regions) of an object are built primarily by the deposition of very fine solidifiable liquid droplets for improved accuracy while the interior regions are built by a mixture of solid powder particles and liquid droplets for improved build speeds. Where needed, the liquid droplets and the solid powder particles are directed to impact substantially the same spots either concurrently or sequentially. Liquid droplets serve the primary purpose of bonding solid particles together to build the bulk of the object, particularly the interior regions. Improved build speeds are achieved through (A) increased over-all material volume flow rates when both liquid droplet ejection device and solid powder dispensing device are operated simultaneously and (B) reduced times for individual layers to solidify to a substantial extent. This latter notion of reduced times is due to the solid particles present being able to cut down the amount of liquid that needs to be solidified. For instance, the core of a large volume of liquid is known to solidify at a lower rate than do the outer regions due to poorer heat transfer. With the presence of fine solid particles, liquid droplets will spread up to occupy thin inter-particle areas and will be able to solidify more rapidly. Additionally, the mere presence of solid particles makes the solid-liquid mixture more viscous or solid-like to begin with so that the over-all time that the deposition device has to wait before starting a next layer is effectively reduced.

The above-cited multiple-channel liquid droplet deposition device may simply be a plurality of separate droplet deposition devices with each device being supplied with possibly different liquid compositions containing different colorants and being capable of ejecting the liquid compositions in the form of droplets on demand. One device or channel may be employed to deposit droplets of a baseline body-building material with other devices being responsible for depositing droplets of selected color inks. Alternatively, each device may be used to deposit a mixture of a baseline material and a selected colorant.

The Apparatus

One embodiment of this invention is an apparatus comprising a material deposition sub-system, an object-supporting platform, and motion devices. The material deposition sub-system is composed of two major components: a liquid droplet deposition device and a powder-dispensing device. The liquid droplet deposition device comprises (1) a multiplicity of flow channels with each channel being supplied with a solidifiable liquid composition, (2) at least one nozzle having a fluid passage in flow communication with one corresponding channel and a discharge orifice, and (3) actuator means located in control relation to these channels for activating droplet ejection through these discharge orifices. The powder-dispensing device comprises (1) at least a flow channel being supplied with solid powder particles, (2) for each flow channel, at least one nozzle having a flow passage in flow communication with the flow channel and a discharge orifice, and (3) valve means located in control relation with corresponding flow channel.

The object-supporting platform is generally flat and is located in close, working proximity to the discharge orifices of the deposition sub-system to receive discharged materials therefrom. The motion devices are coupled to the platform and the material deposition sub-system for moving the deposition sub-system and the platform relative to one another in an X-Y plane defined by first and second directions (X and Y directions) and in a third direction (Z-direction)) orthogonal to the X-Y plane to deposit the liquid droplets and/or solid powder particles to form a three-dimensional object. The motion devices are preferably controlled by a computer system for positioning the deposition sub-system with respect to the platform in accordance with a CAD-generated data file representing the object. Further preferably, the same computer is used to regulate the operations of the material deposition sub-system in such a fashion that liquid droplets and powder particles are dispensed in predetermined sequences and at predetermined proportions.

Specifically, the motion devices are responsive to a CAD-defined data file which is created to represent the 3-D object to be built. An image of the object is first created in a CAD computer. The image is then sectioned into a desired number of layers with each layer being comprised of a plurality of segments represented by a collection of data points. These layer data are then converted to machine control languages that can be used to drive the operation of the functional components, including motion devices. These motion devices operate to provide relative translational motion of the material depositing sub-system with respect to the object platform in a horizontal direction within the X-Y plane. The motion devices further provide relative movements vertically in the Z-direction, each time by a predetermined layer thickness.

The material in each supply of liquid composition may be comprised of, but is not limited to, one or more of the following materials including various adhesives, waxes, thermoplastic polymers, thermosetting resins, metallic alloys, glasses, ceramics, sol-gel mixtures, and combinations thereof. The material may also include combinations containing dissimilar materials added to impart a desired electrical, structural, or other functional characteristic to the material. For making colored objects, preferably each composition also contains a color-making ingredient (referred to as a colorant or ink), which may be a dye, pigment, color concentrate (commonly used in coloring of plastics), or combinations thereof.

One presently preferred liquid composition comprises a hot melt adhesive that exhibits a high adhesion to previously deposited material. The hot melt adhesive also exhibits good mixing characteristics with a variety of colorants. Another preferred material composition comprises fine ceramic, metallic, or polymeric particles dispersed at a high volume content in a liquid (e.g., water) to make a paste. The composition in a paste form normally will not require heating to become a flowable state. In the cases where the liquid content is high, the part-building zone surrounding the platform may be pre-cooled to below the freezing temperature so that the discharged material can rapidly become solidified when in contact with a previous layer or a surface of the platform. A facilitated sublimation procedure may be followed to complete a "freeze-drying" process. Yet another preferred material composition comprises fine ceramic, metallic, or polymeric particles dispersed in a fast vaporizing liquid to make a paste. The liquid may rapidly vaporize, optionally under the assistance of a vacuum pump, to become solidified upon contact with a previous layer or a surface of the platform.

The solid powders may also be selected from a wide variety of material types, including polymer, metal, glass, ceramic, and combinations thereof. In one embodiment, the liquid droplets are small in size (e.g., 15 $\mu$m in diameter or smaller) while the powder particles may be larger in size. The areas near a surface of a part, referred to as the exterior of a part, are preferably built mainly with liquid droplets for improved part accuracy. To achieve a higher build speed, the interior of the part may be built mainly with solid particles which are glued together with a liquid composition. Liquid droplets and solid particles may be deposited concurrently or in sequence. Preferably, liquid compositions and solid particles are chemically compatible so that they can be well bonded together. In the case of co-deposited polymer liquid and polymer powder, the liquid polymer and the solid polymer may be of substantially identical chemical composition; e.g., PVC particles adhered together by PVC melt.

In one embodiment, the droplet deposition device is similar to a multi-channel print-head commonly used in an ink jet printer. The print-head is preferably equipped with heating means to maintain the colorant-carrying material compositions in a liquid state. Ink jet print-heads can generally be divided into two types: one type using thermal energy to produce a vapor bubble in an ink-filled channel that expels a drop of liquid while a second type using a piezoelectric transducer to produce a pressure pulse that expels a droplet from a nozzle. Droplets are dispensed through an orifice to deposit onto predetermined regions of a surface upon which a layer is being built.

In one preferred embodiment, one of the liquid channels may be employed to deliver and deposit a baseline material (e.g., a plastic melt or plastic-liquid paste) that will become the primary constituent material in the object. Such a baseline material is also referred to as a primary body-building material. A selected color ink is then deposited onto this baseline material to create a desired color at a desired spot. Alternatively, the droplets of the baseline material may be deposited simultaneously with the droplets of a color ink dispensed from a different channel. Different parts of a layer and different layers of an object may be built to show different colors.

Advantages of the Invention

The process and apparatus of this invention have several features, no single one of which is solely responsible for its desirable attributes. Without limiting the scope of this invention as expressed by the claims which follow, its more prominent features will now be discussed briefly. After considering this brief discussion, and particularly after reading the section entitled "DESCRIPTION OF THE PREFERRED EMBODIMENTS" one will understand how the features of this invention offer its advantages, which include:

(1) The present invention provides a unique and novel method for producing a three-dimensional object on a layer-by-layer basis under the control of a computer. This method offers an opportunity to impart desirable color patterns to an object, making a form model much more attractive. Both speed and accuracy, which are normally considered to be mutually exclusive in a layer manufacturing technique, can be achieved with the present method.

(2) Most of the layer manufacturing methods, including powder-based techniques such as 3-D printing (3DP) and selective laser sintering (SLS), are normally limited to the fabrication of an object with a uniform material composition. In contrast, the presently invented process readily allows the fabrication of an object having a spatially controlled material composition comprising two or more distinct types of material.

(3) The presently invented method provides a computer-controlled process which places minimal constraint on the variety of materials that can be processed. In the present method, the liquid composition and the solid powder may be selected from a broad array of materials including various organic and inorganic substances and their composites.

(4) The present method provides an adaptive layer-slicing approach and a thickness sensor to allow for in-process correction of any layer thickness variation. The present invention, therefore, offers a preferred method of layer manufacturing when part accuracy is a desirable feature.

(5) In one variation of the presently invented method, fabricated objects may not be permanently fixed (if so desired), but can be easily separated at any one or more of many inter-layer interfaces. The resulting sections can then be easily rejoined to form again the complete object. The object can be thus separated and rejoined at the same or different cross sections, repeatedly and without limitation. Potential applications of forming separated layers of a three-dimensional object include the production of custom-made 3-D puzzles (toys). A set of some hundreds of plastic sheets, when stacked together in the right order, will make a predetermined shape (thus completing a puzzle).

(6) The method can be embodied using simple and inexpensive mechanisms, so that the fabricator equipment can be relatively small, light, inexpensive and easy to maintain.

DESCRIPTION OF THE PREFERRED EMBODIMENTS

Figure 1:
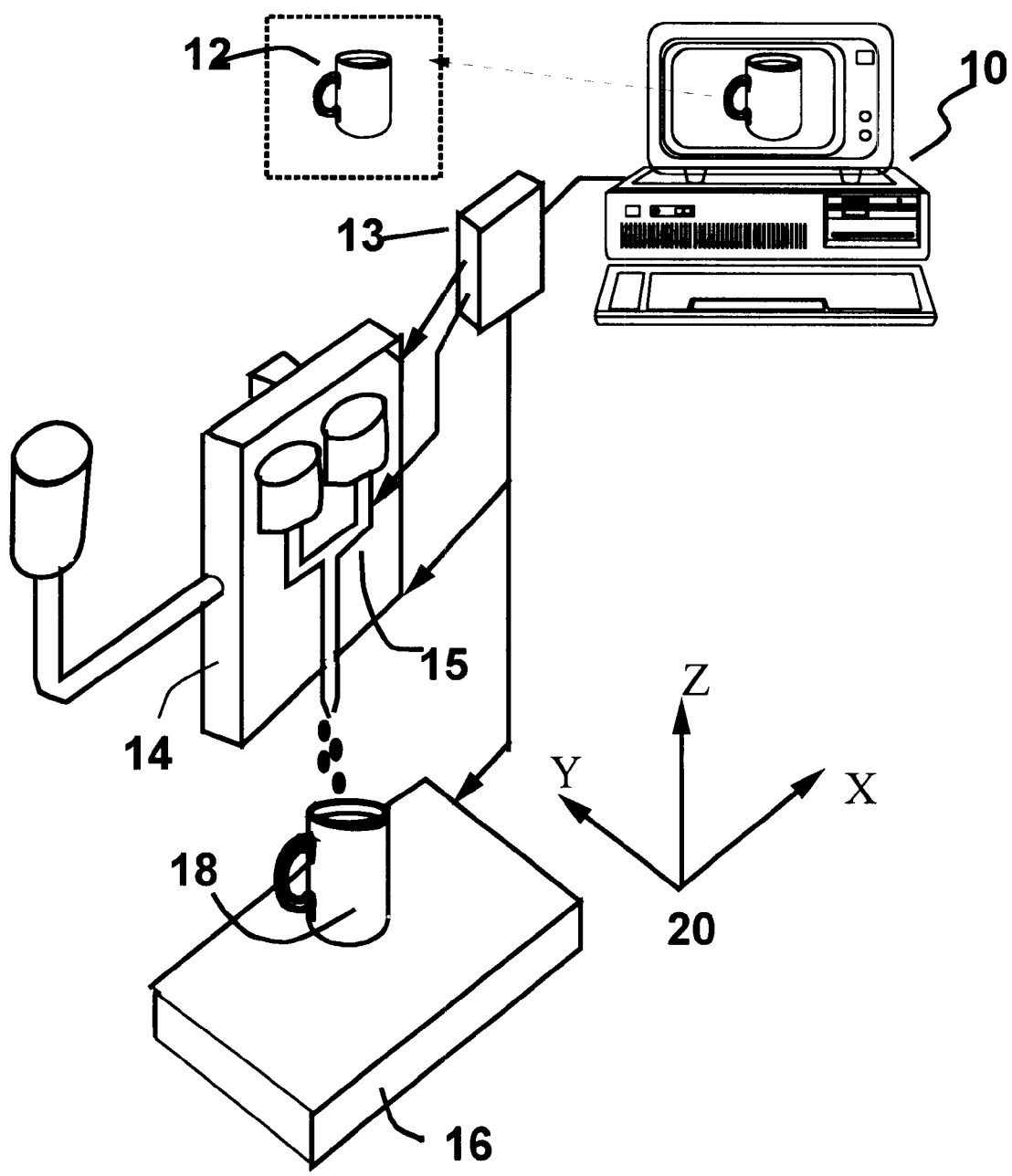
FIG. 1. Schematic of an apparatus for building a 3-D object on a layer-by-layer basis, comprising a multi-channel droplet deposition device, a powder-dispensing device, an object-supporting platform capable of moving in an X-Y plane and in an orthogonal Z-axis in a desired sequence, and a computer control system.

In the drawings, like parts have been endowed with the same numerical references.

FIG. 1 illustrates one embodiment of the apparatus of this invention for making colorful three-dimensional objects. This apparatus is equipped with a computer 10 for creating a drawing or image 12 of an object and, through a hardware controller 13 (including signal generator, amplifier, and other needed functional parts) for controlling the operation of other components of the apparatus. One of these components is a material deposition sub-system which comprises a multiple-channel droplet deposition device 14 and a powder-dispensing device 15. Other components include an object-supporting platform 16, optional temperature-regulating means (not shown) and pump means (not shown) to control the atmosphere of a zone surrounding the platform where a part 18 is being built, and a three dimensional movement system (not shown) to position the platform 16 with respect to the material deposition sub-system in a direction on an X-Y plane and in a Z-direction as defined by the rectangular coordinate system 20 shown in FIG. 1.

Material Deposition Sub-System

Liquid Droplet Deposition Device: There are a broad array of liquid droplet deposition devices that can be incorporated in the presently invented apparatus. One type of deposition devices is a thermal ink jet print-head. A device of this type operates by using thermal energy selectively produced by resistors located in capillary filled ink channels near channel terminating orifices to vaporize momentarily the ink and form bubbles on demand. Each temporary bubble expels an ink droplet and propels it toward the object platform. The following patents all teach about the configurations of thermally activated print-heads: U.S. Pat. No. 4,571,599 to Rezanka, U.S. Pat. No. 4,463,359 to Ayata, et al., and U.S. Pat. No. 4,829,324 to Drake, et al.

Another useful droplet deposition device is a piezoelectric activated ink jet print-head that uses a pulse generator to provide an electric signal. The signal is applied across piezoelectric crystal plates, one of which contracts and the other of which expands, thereby causing the plate assembly to deflect toward a pressure chamber. This causes a decrease in volume which imparts sufficient kinetic energy to the ink in the print-head nozzle so that one ink droplet is ejected through an orifice. Examples of piezoelectric activated ink jet print-heads may be found in U.S. Pat. No. 4,549,191 to Fukuchi and Ushioda, U.S. Pat. No. 4,584,590 to Fishbeck and Wright, and U.S. Pat. No. 4,887,100 to Michaelis.

Figure 2A:
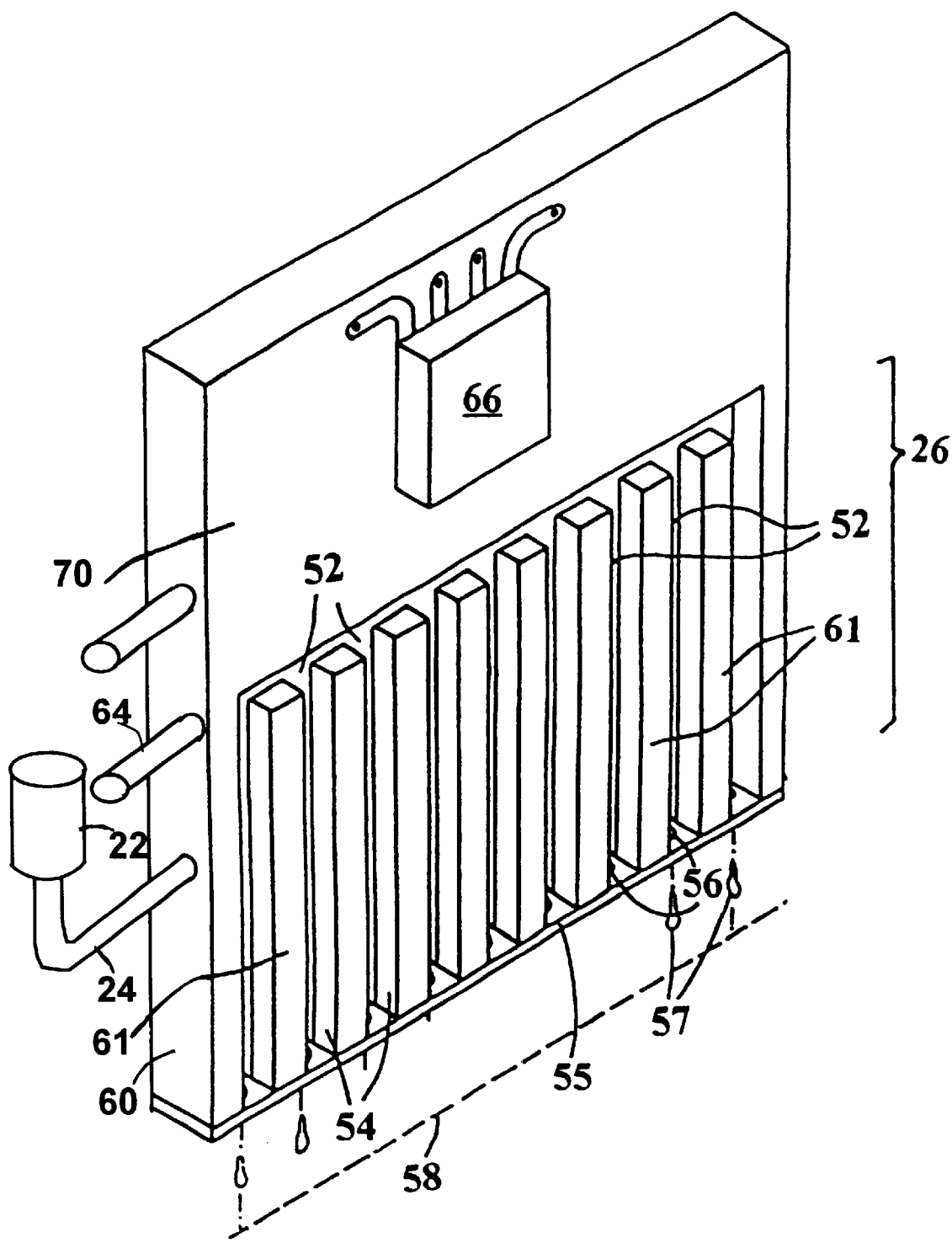
FIG. 2. Schematic of an example of a piezo-electrically actuated multi-channel ink jet print-head for depositing droplets of liquid compositions.
Figure 2C:
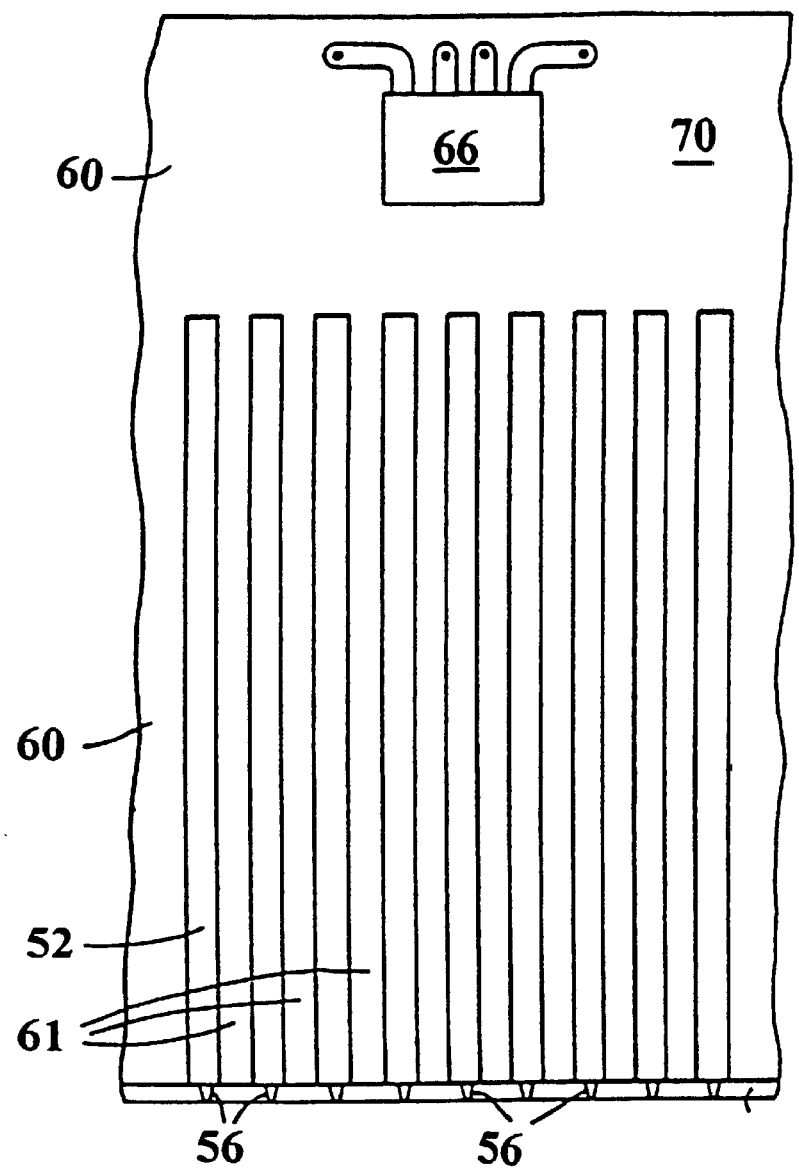
Figure 2B:
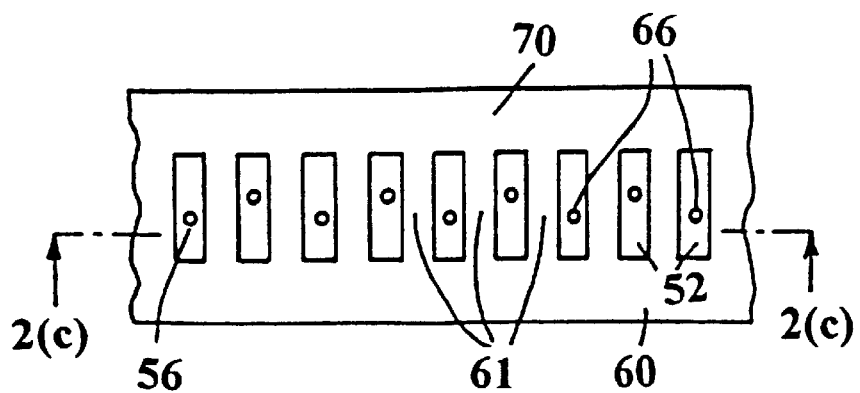

An example of a piezo-electric activated ink jet print-head is shown in FIG. 2. This droplet deposition device is a planar high-density array, drop-on-demand ink jet print-head, comprising a print-head body 60 formed with a multiplicity of parallel ink channels 52, nine only of which are shown and the longitudinal axes of which are disposed in a plane. The channels 52 contain liquid compositions 54 and terminate at corresponding ends thereof in a nozzle plate 55 in which are formed orifices 56, one for each channel. Ink droplets 57 are ejected on demand from the channels 52 and deposited on selected spots of a print line 58 on a previous layer of an object or a surface of the object platform.

The print-head body 60 has a planar base part 70 in which the channels 52 are cut or otherwise formed so as to extend in parallel rearwardly from the nozzle plate 55. The channels 52 are long and narrow with a rectangular cross section and have opposite side walls 61 which extend the length of the channels. The side walls 61 are displaceable transversely relative to the channels axes along substantially the whole of the length thereof, as later described, to cause changes of pressure in the liquid composition in the channels to produce droplet ejection from the orifices 56. Each of the channels 52 connects at its end remote from the orifice, with a transverse channel (not shown) which in turn connects with a liquid supplying reservoir 22 by way of pipe means 24 or 64. Electrical connections (not shown) for activating the channel side walls 61 are made to a silicon chip 66 on the base part 70. Reservoirs are there to receive liquids containing a baseline material and several different colorants. Only one 22 of possibly several reservoirs is shown in FIG. 2. Additional reservoirs may be connected to pipes such as 64. The droplet deposition device as illustrated in FIG. 2 is similar to what is disclosed in U.S. Pat. No. 4,887,100. The present device shown in FIG. 2 contains separate reservoirs and pipes that supply different liquid compositions. Preferably, at least one of the liquid compositions comprises a baseline material for building exterior regions of the object and for binding solid powder particles together to build the interior regions of the object.

For building a colorful object, one reservoir may be allowed to supply a baseline material; i.e., one of the primary body-building materials that constitute the object. Other reservoirs serve to feed different colorants, on a separate basis or in combination thereof. The baseline material-feeding channel and at least one colorant-feeding channel may be operated to eject their respective droplets simultaneously or sequentially for building a portion of an object at a time. Alternatively, the liquid in each reservoir may contain both a baseline material (e.g., plastic melt) and a colorant (e.g., yellow dye). At least one channel containing both a baseline material and a colorant is allowed to operate for building a portion of the object at a time.

In an alternative embodiment of the presently invented apparatus, the multiple-channel device may be simply a plurality of separate droplet deposition devices, each having only one or two channels. In a two-channel device, one channel may be used to deposit a baseline material while the other a color ink. In a working set of several deposition devices, at least one of the channels must deposit a liquid composition that contains a baseline material; other channels may contain only liquid colorants. Alternatively, all channels may feed a mixture of a baseline material and a selected colorant. Preferably, one of the channels is used to deposit a material such as wax for building the necessary support structure.

Preferably, a portion of the liquid deposition device is provided with temperature-controlled means (not shown) to ensure that the material remains in a flowable state while residing in a reservoir, pipe, or channel prior to being dispensed. Heating and cooling means (e.g., heating elements, cooling coils, thermocouple, and temperature controller; not shown) may be provided to a region surrounding the platform 16 to control the solidification behavior of the material on the platform.

Figure 3:
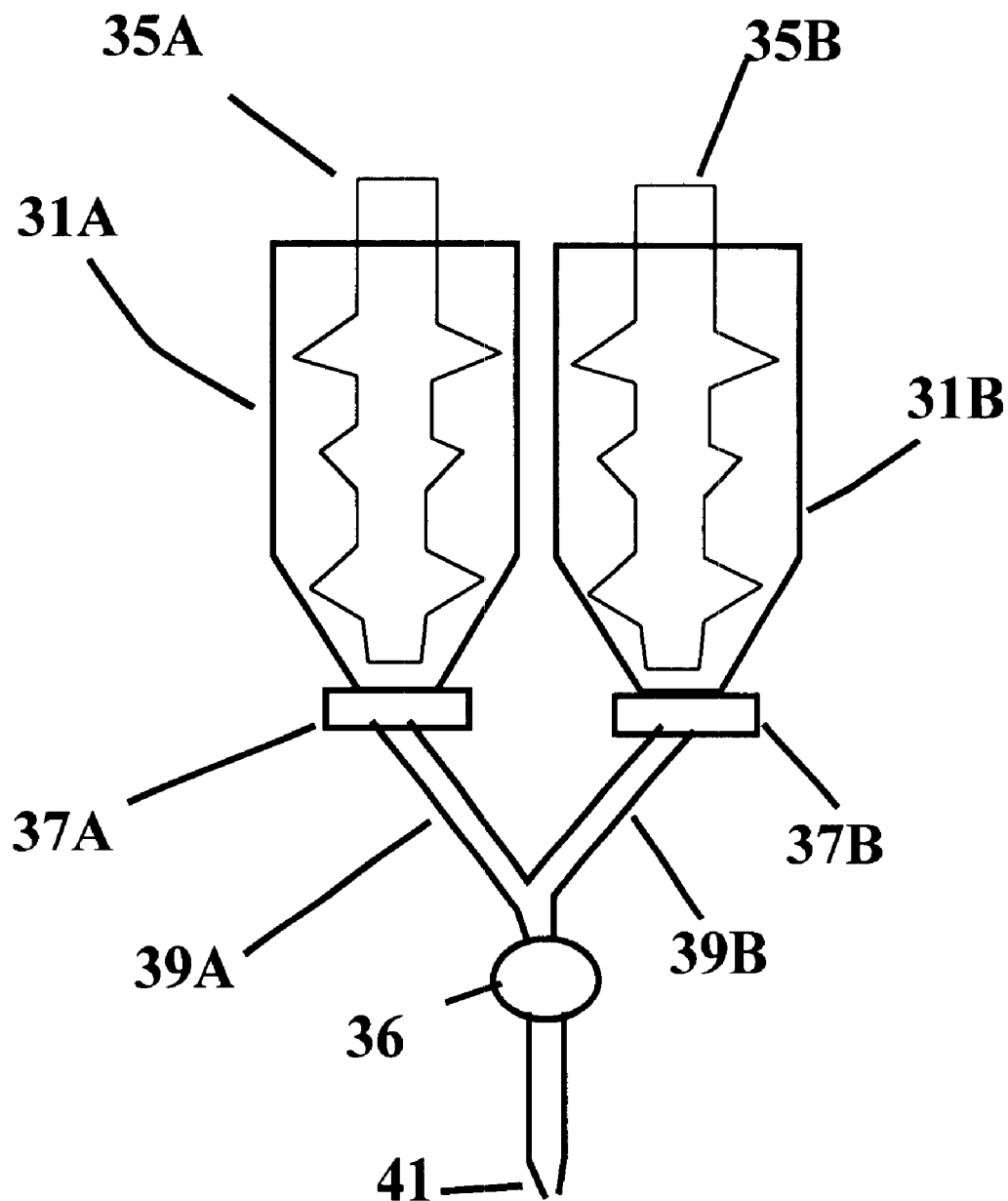
FIG. 3. Schematic drawing of a simple multi-channel powder-delivery device.

Solid Powder Deposition Device: FIG. 3 schematically shows a multi-channel powder delivery system which is capable of supplying and dispensing a mixture of different powders at a desired proportion. Only two channels are shown here. The two chambers 31A, 31B are used to house different solid powders. An optional stirring device 35A or 35B is used to facilitate feeding of powder particles through valves 37A or 37B. These valves are preferably electronically connected to the machine controller 13, which is regulated by the computer 10. If a valve is turned on, powder particles will flow through a pipe 39A or 39B, enter an optional mixing chamber 36, and be dispensed through an orifice 41. The mixing chamber 36 provides a place where different powders coming from different chambers can be mixed together before they are dispensed. The proportion between powders can be readily varied continuously or intermittently by adjusting, for instance, the opening sizes of the valves 37A, 37B.

Figure 4:
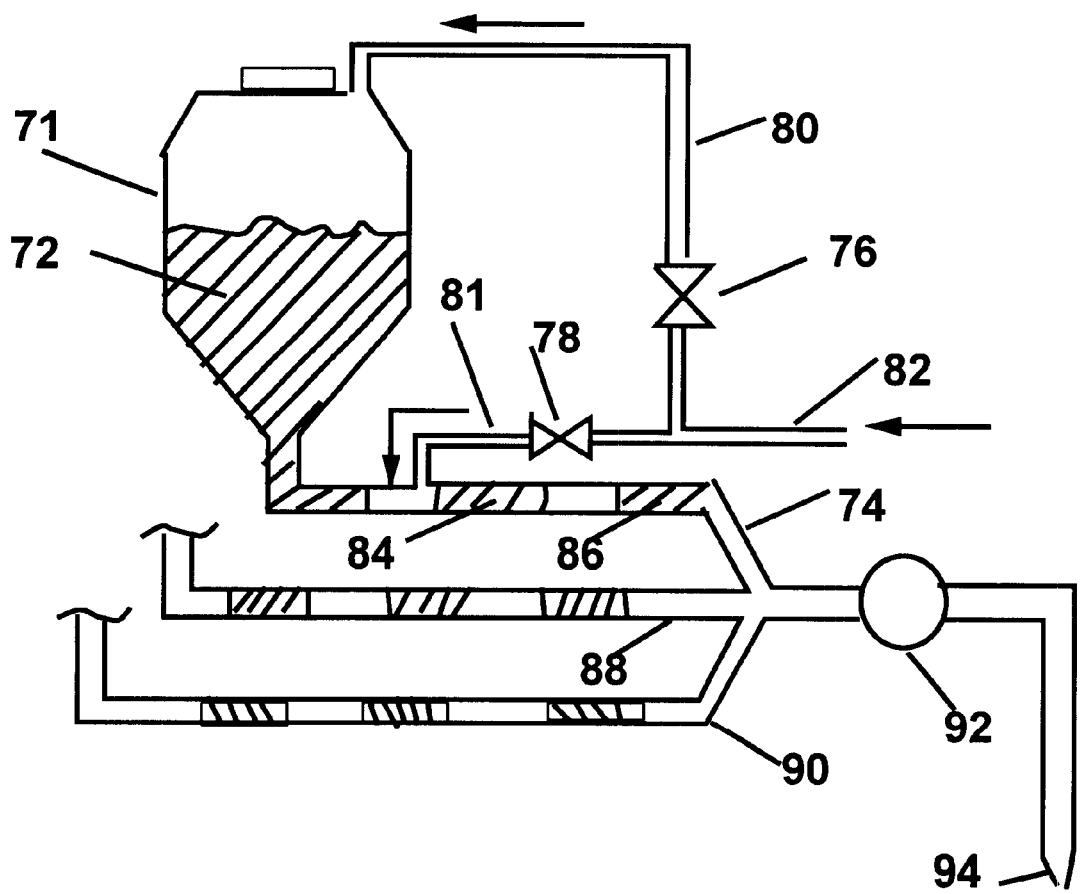
FIG. 4. Schematic drawing of a multi-channel plug-phase pneumatic powder conveying and dispensing device.

FIG. 4 schematically shows another example of multiple-channel powder delivery devices. Only three channels of this pneumatic or air-driven apparatus are shown. This device makes use of the approach known as plug-phase conveying to reduce clogging that frequently occurred to dense-phase conveying. Both approaches are well known in the art of pneumatic powder transportation. In the present device, a container 71 is used to house a powder 72. Compressed air is introduced through pipe 82. Then, through alternating operations of valves 76 and 78, air runs through pipes 80 and 81, respectively, to create and convey forward distinct plugs of powder material in first channel 74. Other channels (e.g., 88 and 90) may be similarly equipped with containers, pipes, and valves (not shown) to create and move plugs of different types of powder material. Plugs of materials may be allowed to mix at an optional mixing chamber 92 and then dispensed through an orifice 94 of a nozzle. The present device does not provide a continuous flow of powder because plugs of material are separated by plugs of air. If necessary, however, a continuous flow of powder can be achieved by running two parallel pipelines operating at opposite phases. With the present device, by controlling the velocity of plugs throughout each of the material supply systems, different proportions of each material could be combined and deposited. Such a multiple-channel powder delivery device will make it possible to produce parts with spatially tailored material compositions.

Figure 8:
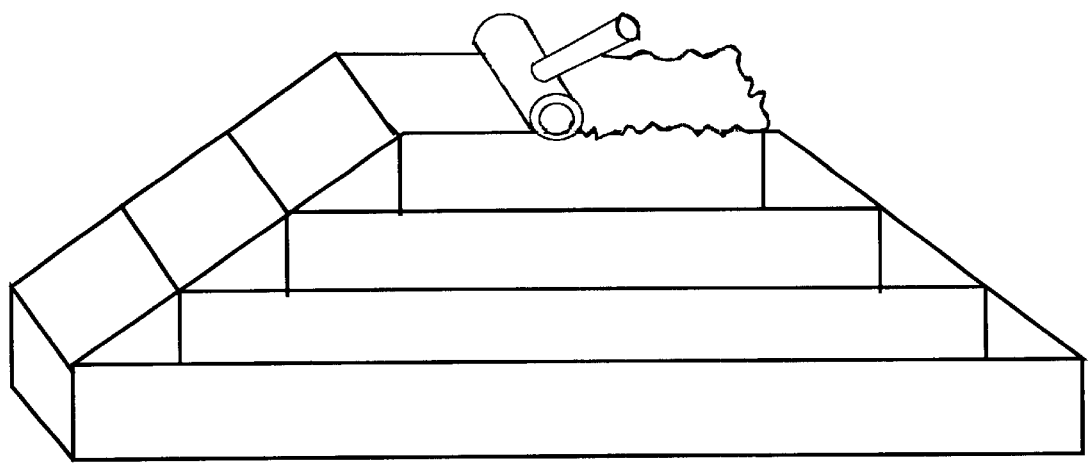
FIG. 8. A schematic diagram showing a compaction effector 115 that has properly compacted an area 117 and is in the process of compacting the remaining area 119 of a layer.

Optionally, a compaction effector such as a doctor's blade or a small roller (e.g., 115 in FIG. 8) may be used to facilitate compaction of regions that contain a significant proportion of solid powder. Fine powder particles when un-compacted tend to contain interstitial air spaces between particles. The deposited liquid droplets serve to displace some of these spaces. It may be advantageous to further reduce or eliminate these spaces to density the object and to achieve desired thickness for individual layers by moving a roller to roll over (or a blade to compress) the powder-rich regions. FIG. 8 schematically shows a roller-type compaction effector 115 that has properly compacted an area 117 and is in the process of compacting the remaining area 119 of a layer. The compaction effector may be attached to the material deposition sub-system and be regulated by the same movement devices.

Object-Supporting Platform

Referring again to FIG. 1, the object platform 16 is located in close, working proximity to the dispensing nozzles of the material deposition sub-system. The upper surface of the platform preferably has a flat region sufficiently large to accommodate the first few layers of the deposited material. Preferably, the liquid deposition device 14 and solid powder dispensing device 15 of the material deposition sub-system are fastened to move as one unit. The platform 16 and the material deposition sub-system are equipped with mechanical drive means for moving the platform relative to the deposition device in three dimensions along the X-, Y-, and Z-axes in a rectangular coordinate system in a predetermined sequence and pattern, and for displacing the nozzle a predetermined incremental distance relative to the platform. This can be accomplished, for instance, by allowing the platform 16 to be driven by three linear motion devices, which are powered by three stepper motors to provide movements along the X-, Y-, and Z-directions, respectively. Motor means are preferably high resolution reversible stepper motors, although other types of drive motors may be used, including linear motors, servomotors, synchronous motors, D.C. motors, and fluid motors. Mechanical drive means including linear motion devices, motors, and gantry type positioning stages are well known in the art.

Z-axis movements are executed to displace the platform 16 relative to the material deposition sub-system or to displace the deposition sub-system relative to the platform and, hence, relative to each layer deposited prior to the start of the formation of each successive layer. In one possible arrangement, the deposition sub-system may be mounted in a known fashion for movement in the X-Y plane, with the platform 16 supported for separate movement toward and away from the deposition sub-system along the Z-direction. Alternatively, the platform may be supported for movement in the X-Y plane, with the deposition sub-system mounted for separate movement along the Z-direction toward and away from the platform. Another alternative is to have the movements in the X-Y plane and in the Z-direction all to be carried out by either the platform only or by the deposition sub-system only. It will be understood that movement in the X-Y plane need not be limited to movement in orthogonal directions, but may include movement in radial, tangential, arcuate and other directions in the X-Y plane.

These movements will make it possible for the deposition sub-system to deposit and form multiple layers of materials of predetermined thickness, which build up on one another sequentially as the material solidifies after discharge from the orifice. The rate at which the droplets are discharged from the discharge orifice onto the platform is dictated by the frequency of the piezo-electric pulses and the orifice size. This rate can be adjusted, by varying the pulse signal generating speed, to meet the possible needs of variable rate at which the nozzle moves with respect to the platform. The powder deposition rate depends upon the valve opening sizes (e.g., in FIG. 3) and the powder plug transport rate (FIG. 4).

Sensor means may be attached to proper spots of the object platform or the material deposition sub-system to monitor the physical dimensions of the physical layers being deposited. The data obtained are fed back periodically to the computer for re-calculating new layer data. This option provides an opportunity to detect and rectify potential layer variations; such errors may otherwise cumulate during the build process, leading to significant part inaccuracy. Many prior art dimension sensors may be selected for use in the present apparatus.

Materials

The liquid compositions do not have to be in a melt state. A water-soluble material such as poly (ethylene oxide) may be allowed to mix with a predetermined amount of water to form a flowable solution or paste. Some materials (e.g., plaster and starch) may be dispersed, but not completely dissolved, in water or another type of non-toxic liquid. These types of materials may also be fed into the reservoirs along with water or a proper liquid to make a paste. This fluid may also be mixed with a selected colorant, preferably in liquid or fine powder form to form an ejectable liquid composition.

The discharged fluid that comes in contact with the object platform or a previous layer must meet two conditions. The first condition is that this material must have a sufficiently high viscosity to prevent excessive flow when being deposited; this is required in order to achieve good dimensional accuracy. The second condition is that the newly discharged material must be able to adhere to a previous layer. These two conditions can be met by discharging the following types of materials under a specified condition:

Type I: A ceramic, metallic, wax, or semi-crystalline polymer material must be maintained at a temperature above its melting point just before being discharged. The object platform and the previous layers must be maintained at a temperature lower than its melting temperature. The portion of the previous layer facing the deposition device must have been solidified before the new material is brought in contact with this portion of the previous layer. For the purpose of producing colorful form models, polymers are preferred materials to use. Examples of semi-crystalline polymers are polyamide (or nylon), poly (ethylene terephthalate) (PET), and polypropylene (PP).

Type II: A non-crystalline material such as glass (e.g., boro-silicate glass and soda-lime-silica glass) and amorphous thermoplastic polymer material must be maintained at a temperature slightly above its glass transition temperature just before being discharged. The object platform and the previous layers must be maintained at a temperature lower than its glass transition temperature. The portion of the previous layer facing the nozzle must have been solidified before the new material is brought in contact with this portion of the previous layer. Examples of substantially amorphous thermoplastic polymers are polystyrene (PS), acrylonitrile-butadiene-styrene copolymer (ABS), poly methyl methacrylate (PMMA), and poly carbonate (PC).

Type III: A liquid-soluble material (e.g., water soluble polymer) must be maintained at a solution state with a high solute content (low percentage of liquid). The object platform and the previous layers must be maintained at a temperature lower than (preferably much lower than) the freezing temperature of the liquid so that the new material when brought in contact with a previous layer is rapidly frozen. Upon completion of the object-building procedure, the frozen object is then subjected to a vacuum environment, or under a pumping condition, to promote sublimation of the "solvent" component (i.e., the "liquid" component now in its solid state). This is essentially a freeze-drying procedure well known in the food processing industry. Upon completion of this freeze-drying procedure, the object will be highly porous and may be impregnated with a material such as a wax or epoxy resin for improved integrity.

Type IV: A solid material (e.g., fine ceramic, metallic, or polymeric powder) that can be dispersed (mixed but not dissolved) in a liquid is made into a paste of proper viscosity and preferably of high solid content. The particle sizes are preferably as small as possible, at least smaller than 15 $\mu$m and preferably smaller than 1 $\mu$m in diameter, to prevent clogging the ejection orifice of the liquid droplet deposition device. Preferably, the liquid is a fast vaporizing one such as ethanol, methanol, and acetone; a non-toxic material (e.g., alcohol) having a high vapor pressure at room temperature is most desirable. The part-building zone surrounding the object platform is preferably under a vacuum or pumping condition to promote vaporization of the liquid, rapidly leaving behind the solid. A lower temperature environment may be desired for reduced flowability of the paste. Alternatively, a freeze-drying procedure may be followed to remove the liquid component.

Type V: A fast-curing thermosetting resin (e.g., a two-part epoxy) may be maintained in an oligomer state prior to being discharged. As soon as being dispensed, the resin will rapidly gel to an extent that the glass transition temperature of this reacting resin quickly approaches or exceeds the object platform environment temperature, thereby solidifying the resin. The gelation process of selected resins, e.g., some photo curable epoxy resins commonly used in stereo lithography, may be further accelerated by exposing the deposited resin to an ultraviolet beam. Fast curing resins are well known in the art and several formulations are commercially available.

Type VI: A sol-gel material (e.g., a polymer gel composed of a lightly cross-linked network of chains with small molecules occupying interstices between these chains) can be formulated to have proper flowability prior to being discharged from a nozzle. The gelation process of the material when brought in contact with the object platform or a previous layer may be rapidly advanced further to increase its viscosity to facilitate solidification. A variety of natural polymer powders, such as lotus root and corn starch, may be well dispersed in warm water to produce paste for being readily transported to a deposition device. Additional water at a higher temperature is then added just prior to the discharging step to activate the fast gelation process. The new material will naturally glue to a previous layer, yet will not flow to any significant extent in this highly gelled state. Synthetical polymers such as polyacrylamide also has exhibited a similar behavior and has been found to successfully make a 3-D gel object.

In another embodiment of the present invention the multi-channel liquid deposition device simply comprises a multiplicity of separate droplet deposition devices. However, at least one separate deposition device is supplied with a low-melting material (e.g., a wax) so that this nozzle is operative to discharge and build a support structure for any un-supported feature in the three-dimensional object being built. Un-supported features in an object include isolated islands, overhangs, and some suspended members of the object. There are many commercially available metering and dispensing nozzles that are capable of depositing wax and various resins such as epoxy and polyurethane. Examples include various two-component dispensing devices such as PosiDot® from Liquid Control Corp. (7576 Freedom Ave., North Canton, Ohio) and Series 1125 Meter-Mix-Dispense systems from Ashby-Cross Company, Inc. (418 Boston Street, Topsfield, Mass.). Any of such prior art dispensing nozzles can be incorporated as a part of the presently invented apparatus to deposit a resin- or wax-based support structure when and where needed.

Mathematical Modeling and Creation of Logical Layers

Figure 5:
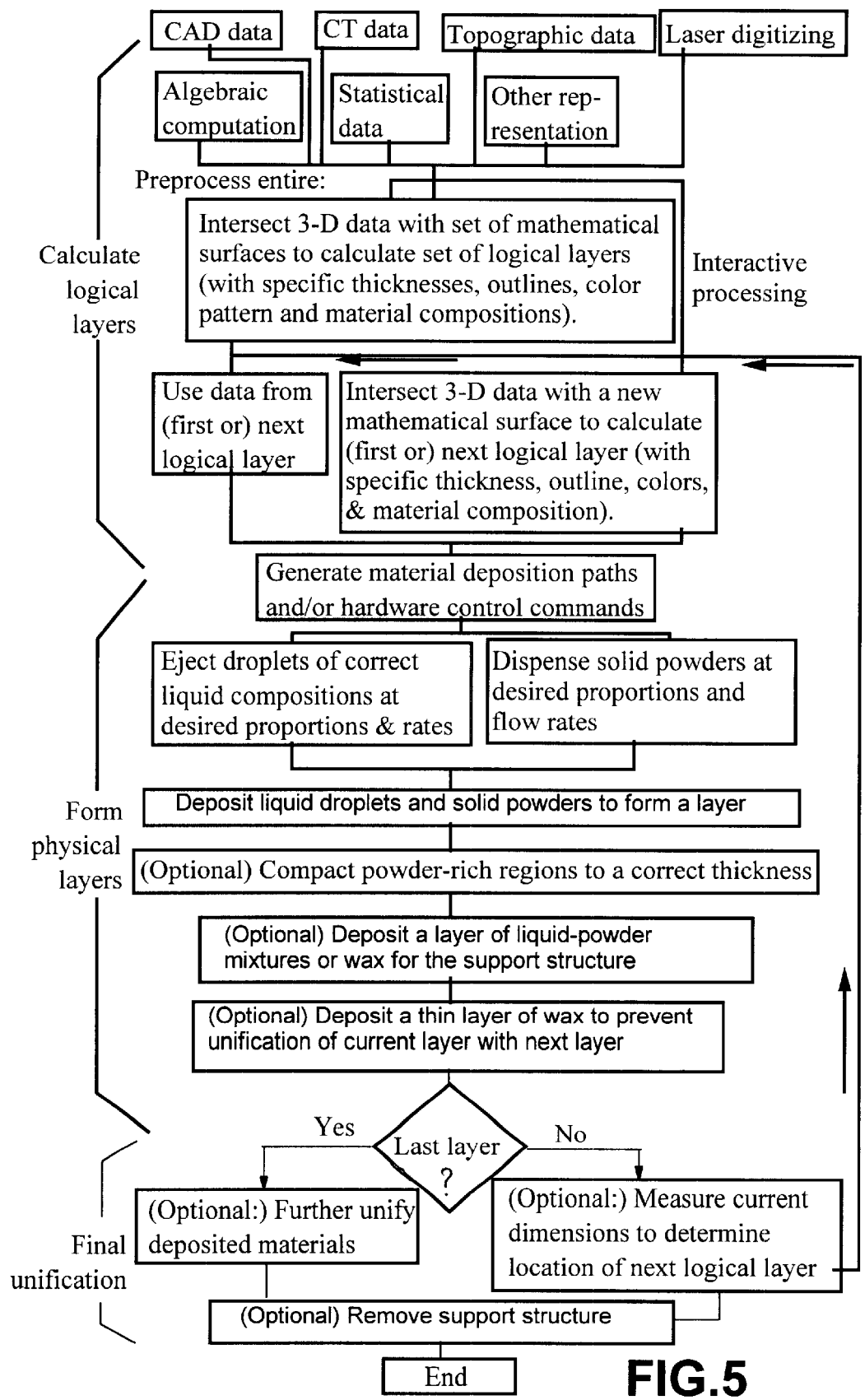
FIG. 5. Flow chart indicating a preferred process that involves using a computer and required software programs for adaptively slicing the image of an object into layer data, for optionally generating data files for support structures, and for controlling various components of the 3-D object building apparatus.

A preferred embodiment of the present invention is a solid freeform fabrication process in which the execution of various steps may be illustrated by the flow chart of FIG. 5. The process begins with the creation of a mathematical model (e.g., via computer-aided design, CAD), which is a data representation of a 3-D object. This model is stored as a set of numerical representations of layers which, together, represent the whole object. A series of data packages, each data package corresponding to the physical dimensions of an individual layer of deposited materials, is stored in the memory of a computer in a logical sequence so that the data packages correspond to individual layers of the materials stacked together to form the object.

Specifically, before the constituent layers of a 3-D object are formed, the geometry of this object is logically divided into a sequence of mutually adjacent theoretical layers, with each theoretical layer defined by a thickness and a set of closed, nonintersecting curves lying in a smooth two-dimensional (2-D) surface. These theoretical layers, which exist only as data packages in the memory of the computer, are referred to as "logical layers." This set of curves forms the "contour" of a logical layer or "cross section". In the simplest situations, each 2-D logical layer is a plane so that each layer is flat, and the thickness is the same throughout any particular layer. However, this is not necessarily so in every case, as a layer may have any desired curvature and the thickness of a layer may be a function of position within its two-dimensional surface. The only constraint on the curvature and thickness function of the logical layers is that the sequence of layers must be logically adjacent. Therefore, in considering two layers that come one after the other in the sequence, the mutually abutting surfaces of the two layers must contact each other at every point, except at such points of one layer where the corresponding point of the other layer is void of material as specified in the object model.

As summarized in the top portion of FIG. 5, the data packages for the logical layers may be created by any of the following methods:

(1) For a 3-D computer-aided design (CAD) model, by logically "slicing" the data representing the model, (2) For topographic data, by directly representing the contours of the terrain, (3) For a geometrical model, by representing successive curves which solve "z=constant" for the desired geometry in an x-y-z rectangular coordinate system, and (4) Other methods appropriate to data obtained by computer tomography (CT), magnetic resonance imaging (MRI), satellite reconnaissance, laser digitizing, line ranging, or other methods of obtaining a computerized representation of a 3-D object.

An alternative to calculating all of the logical layers in advance is to use sensor means to periodically measure the dimensions of the growing object as new layers are formed, and to use the acquired data to help in the determination of where each new logical layer of the object should be, and possibly what the curvature and thickness of each new layer should be. This approach, called "adaptive layer slicing", could result in more accurate final dimensions of the fabricated object because the actual thickness of a sequence of stacked layers may be different from the simple sum of the intended thicknesses of the individual layers.

The closed, nonintersecting curves that are part of the representation of each layer unambiguously divide a smooth two-dimensional surface into two distinct regions. In the present context, a "region" does not mean a single, connected area. Each region may consist of several island-like subregions that do not touch each other. One of these regions is the intersection of the surface with the desired 3-D object, and is called the "positive region" of the layer. The other region is the portion of the surface that does not intersect the desired object, and is called the "negative region." The curves are the boundary between the positive and negative regions, and are called the "outline" of the layer. In the present context, the liquid droplets and solid powder are allowed to be deposited in the "positive region" while a wax may be deposited in certain parts or all of the "negative region" in each layer to serve as a support structure.

A preferred embodiment of the present invention contains a material deposition sub-system, an object platform, and motion devices that are regulated by a computer-aided design (CAD) computer 10 and a machine controller 13. For example, as schematically shown in FIG. 1, the CAD computer with its supporting software programs operates to create a three-dimensional image of a desired object 12 or model and to convert the image into multiple elevation layer data, each layer being composed of a plurality of segments.

As a specific example, the image of a three-dimensional object 12 may be converted into a proper format utilizing commercially available CAD/Solid Modeling software. A commonly used format is the stereo lithography file (.STL), which has become a defacto industry standard for rapid prototyping. The object image data may be sectioned into multiple layers by a commercially available software program. Each layer has its own shape and dimensions. These layers, each being composed of a plurality of segments, when combined together, will reproduce the complete shape of the intended object. When a colorful object is desired, these segments are preferably sorted in accordance with their colors. This can be accomplished by taking the following procedure:

When the stereo lithography (.STL) format is utilized, the image is represented by a large number of triangular facets that are connected to simulate the exterior and interior surfaces of the object. The triangles may be so chosen that each triangle covers one and only one color. In a conventional .STL file, each triangular facet is represented by three vertex points each having three coordinate points, $(x_1,y_1,z_1)$, $(x_2,y_2,z_2)$, and $(x_3,y_3,z_3)$, and a unit normal vector $(i,j,k)$. Each facet is now further endowed with a color code. During the slicing step, neighboring data points with the same color code on the same layer may be sorted together. These segment data are then converted into programmed signals (data for selecting deposition tools and tool paths) in a proper format, such as the standard NC G-codes commonly used in computerized numerical control (CNC) machinery industry. These layering data signals may be directed to a machine controller which selectively actuates the motors for moving the deposition sub-system with respect to the object-supporting platform, activates signal generators, drive the valve means in the powder dispensing device, drives the optional vacuum pump means, and operates optional temperature controllers. It should be noted that although .STL file format has been emphasized in this paragraph, many other file formats have been employed in different commercial rapid prototyping and manufacturing systems. These file formats may be used in the presently invented system and each of the constituent segments for the object image may be assigned a color code. Similarly, if an object of different material compositions at different portions is desired, each segment may also be coded with a specific material composition.

The three-dimensional motion controller is electronically linked to the mechanical drive means and is operative to actuate the mechanical drive means in response to "X," "Y," "Z" axis drive signals for each layer received from the CAD computer. Controllers that are capable of driving linear motion devices are commonplace. Examples include those commonly used in a milling machine.

Numerous software programs have become available that are capable of performing the presently specified functions. Suppliers of CAD/Solid Modeling software packages for converting CAD drawings into .STL format include SDRC (Structural Dynamics Research Corp. 2000 Eastman Drive, Milford, Ohio 45150), Cimatron Technologies (3190 Harvester Road, Suite 200, Burlington, Ontario L7N 3N8, Canada), Parametric Technology Corp. (128 Technology Drive, Waltham, Mass. 02154), and Solid Works (150 Baker Ave. Ext., Concord, Mass. 01742). Optional software packages may be utilized to check and repair .STL files which are known to often have gaps, defects, etc. AUTOLISP can be used to convert AUTOCAD drawings into multiple layers of specific patterns and dimensions.

Several software packages specifically written for rapid prototyping have become commercially available. These include (1) SOLIDVIEW RP/MASTER software from Solid Concepts, Inc., Valencia, Calif.; (2) MAGICS RP software from Materialise, Inc., Belgium; and (3) RAPID PROTOTYPING MODULE (RPM) software from Imageware, Ann Arbor, Mich. These packages are capable of accepting, checking, repairing, displaying, and slicing .STL files for use in a solid freeform fabrication system. MAGICS RP is also capable of performing layer slicing and converting object data into directly useful formats such as Common Layer Interface (CLI). A CLI file normally comprises many "polylines" with each polyline being an ordered collection of numerous line segments. These and other software packages (e.g. Bridgeworks from Solid Concepts, Inc.) are also available for identifying an unsupported feature in the object and for generating data files that can be used to build a support structure for the unsupported feature. The support structure may be built by a separate fabrication tool or by the same deposition device that is used to build the object.

A company named CGI (Capture Geometry Inside, currently located at 15161 Technology Drive, Minneapolis, Minn.) provides capabilities of digitizing complete geometry of a three-dimensional object. Digitized data may also be obtained from computed tomography (CT) and magnetic resonance imaging (MRI), etc. These digitizing techniques are known in the art. The digitized data may be re-constructed to form a 3-D model on the computer and then converted to .STL files. Available software packages for computer-aided machining include NC Polaris, Smartcam, Mastercam, and EUCLID MACHINIST from MATRA Datavision (1 Tech Drive, Andover, Mass. 01810).

Formation of the Physical Layers

The data packages are stored in the memory of a computer, which controls the operation of an automated fabricator comprising a material deposition sub-system, an object platform, and motion devices. Using these data packages, the computer controls the automated fabricator to manipulate the fabrication materials (liquid compositions and powder particles) to form individual layers of materials in accordance with the specifications of an individual data package. The liquid material compositions used to form the layer contours preferably have the property that they can be readily solidified and consolidated layer-by-layer. In one embodiment of the invention, the liquid compositions and their mixtures with solid powder particles preferably have the further property that the contours of the fabrication materials when brought into contact bond to each other so that individual layers can be readily unified.

In an alternative embodiment, however, consolidation conditions for individual layers may be so chosen that any two adjacent layers may be allowed to stay separated (un-unified). Possibly, the materials may require ancillary treatment to have the desired bonding characteristic. For instance, the surface of a region of the fabrication materials, upon consolidation, may be coated with wax that will not bond to the fabrication materials in this layer and its adjacent layer that is deposited later. Such a unification-preventing substance may be selected from any type of material that will not get sintered, solidified, or chemically bonded with the fabrication materials under the environmental conditions in which the fabrication materials are consolidated. Wax, being weak, also allows easy separation between two layers.

The fabrication materials do not have to be homogeneous. They may, for example, exhibit variations in composition based upon the structural or physical requirements of the desired object begin built. These variations may serve to accomplish internal variations of the physical properties of the object, such as hardness, mass density, and coefficient of thermal expansion and variations of external appearance such as color patterns. Another case in which the deposited materials may be inhomogeneous would be one in which the materials consist of a stratum of a primary material and a stratum of adhesive material. In this example, the primary material would provide the gross physical characteristics of the object, while the adhesive would generally provide bonding between the layers, although the adhesive can also contribute to the overall characteristics. In one preferred embodiment, the powder particles may be deposited to comprise a spatially controlled material composition comprising two or more distinct types of materials. In a further specific embodiment, the powder particles may be deposited in continuously varying concentrations of distinct types of materials. These material composition variations can be readily accomplished by operating the presently discussed powder-dispensing device.

If composition variation of a deposition material is desired within any particular layer, and if the mechanism (e.g., in FIGS. 2, 3, and 4) for depositing the fabrication material has the capability of depositing the required various compositions automatically, then the variation in composition may be represented mathematically within the data package for each layer, and the mathematical representation may be used to control the composition of materials deposited. However, if the mechanism for depositing a material is limited to providing layers of any one specific composition at a time, then variations in composition may be accomplished by logically separating a particular layer into sub-layers, where each sub-layer is composed of a different material, and the union of the sub-layers is equal to the particular layer. Each sub-layer is then treated as a distinct layer in the deposition process, and the complete layer is formed by the formation and bonding of a succession of its constituent sub-layers. If the interface between sub-layers is along surfaces perpendicular to the layers, and not along surfaces parallel to the layers, then the bonding of each sub-layer is not to the previous sub-layer, but to the previous complete layer.

Figure 6A:
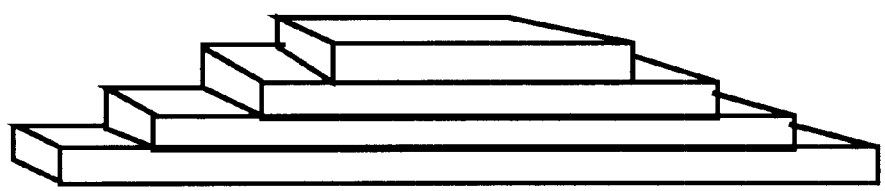
FIG. 6. (A) schematically shows the "staircase effect" of an object built by layer-manufacturing; (B) schematically shows a perspective view of the desired 3-D shape of this object; (C) and (D) schematically show that this staircase effect can be effectively reduced or eliminated by depositing fine liquid droplets in a gradient-thickness manner onto the peripheral or exterior boundary regions of individual layers; and (E) shows that a peripheral region may be sliced into several thinner logical layers which can be converted into programmed signals to drive the deposition of liquid droplets in this region.
Figure 6B:
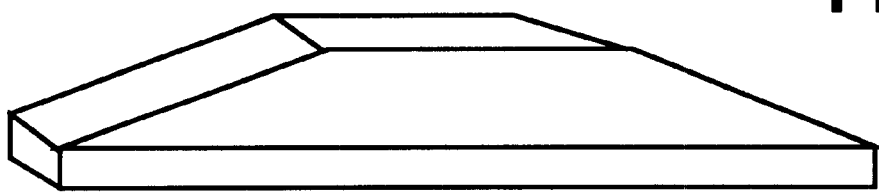
Figure 6C:
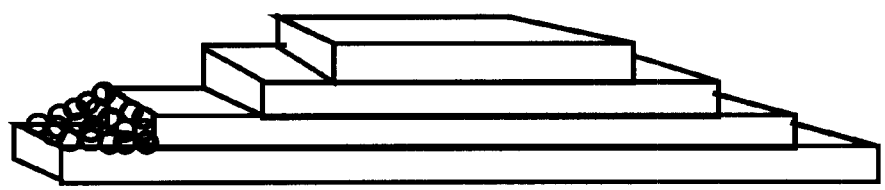
Figure 6D:
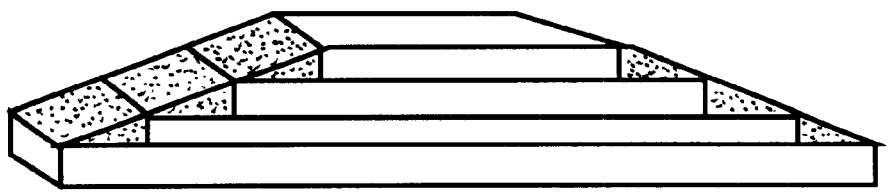
Figure 6E:
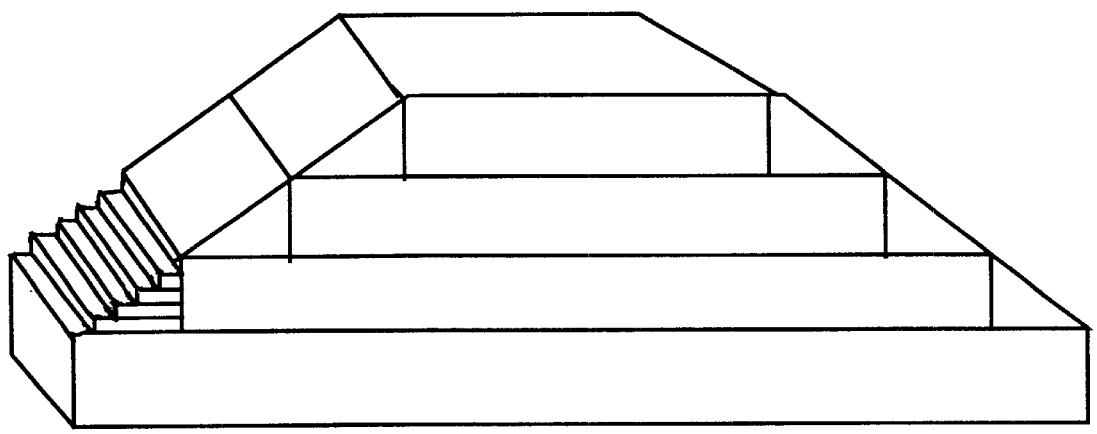

FIG. 6(B) schematically shows a perspective view of a desired 3-D object. This object, if built by a conventional SFF technique layer-by-layer, will likely show a "staircase effect" as indicated in FIG. 6(A). As shown in FIGS. 6(C) and (D), the steps (peripheral zones) between two layers may be deposited with fine liquid droplets in a gradient-thickness manner. These droplets are stacked one upon another with the thickness varying from being very thin (e.g. one droplet size) at one end of each "step" to being as thick as the next layer at another end of this step. These step zones may be built primarily with fine liquid droplet compositions while the bulk of individual layers may be built with mixtures of liquid droplets and powder particles. This strategy effectively reduces or eliminates the staircase effect and improves the part accuracy. This strategy may be carried out, for instance, by further dividing each peripheral area into several thinner sub-layers, as schematically shown in FIG. 6(E). Each sub-layer may be mathematically considered as a logical layer of which the data can be converted into programmed signals to drive the liquid droplet deposition device to form a gradient-thickness peripheral zone.

Figure 7:
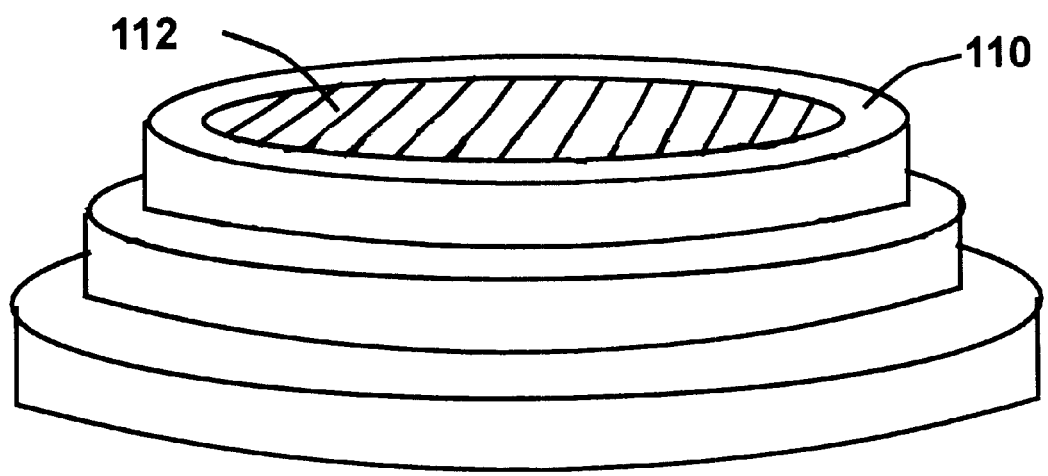
FIG. 7. A schematic diagram showing the exterior boundary zone 110 formed of liquid droplets and interior space 112 formed of mixtures of liquid droplets and powder particles.

Fine liquid droplets may be deposited at selected peripheral zones for the purpose of creating a color pattern because, as indicated earlier, color inks can be more readily incorporated in devices such as inkjet print-heads. The exterior surface of an object, when sliced into a plurality of layers, will serve to define the outside contour boundary curves of a cross-section. A liquid droplet deposition device may be prescribed to trace out these boundary curves to form boundary zones (110 in FIG. 7) primarily composed of liquid droplets of predetermined colors or material compositions. The width of a boundary zone may be predetermined. A wider boundary would mean that the liquid droplet zone extends deeper toward the interior of a cross-section. The inner edge of this boundary zone defines an inner space (112 in FIG. 7) which may be filled with mixtures of liquid droplets and powder particles for an improved built speed. FIG. 7 also shows the staircase effect. Again, this effect can be significantly reduced by using liquid droplet ejection device to build gradient-thickness peripheral zones. With such an added capability, it is now possible to slice the object into much thicker layers and fill the interior space with large amounts of liquid droplet-solid powder mixtures. Thicker layers mean a shorter mathematical slicing time, fewer layers to build, and faster over-all build rate. Slicing thicker layers in other SFF technologies would normally result in a loss of accuracy due to a more severe staircase effect. In the present invention, however, the problem of staircase effect can be overcome by building gradient-thickness peripheral zones. Hence, both speed and precision can be achieved with the presently invented process and apparatus.

As another embodiment of the present invention, therefore, a solid freeform fabrication process may comprise the steps of:

(1) operating a material deposition sub-system for (A) supplying multiple liquid compositions containing different colorants and ejecting the liquid compositions in the form of droplets on demand and (B) dispensing and directing solid powder particles to substantially the same spots on a surface of the substrate on which an object is being deposited;

(2) providing an object-supporting platform in a close working vicinity of the material deposition sub-system to receive the liquid droplets and solid particles therefrom; and (3) during the material deposition process, moving the deposition sub-system and the object platform relative to one another in an X-Y plane defined by a first and second direction and in a third or Z direction orthogonal to the X-Y plane to form the deposited materials into a three dimensional object.

A preferred embodiment is a process as set forth in the above three steps, wherein the moving step includes the steps of (a) moving the material deposition sub-system and the platform relative to one another in a direction parallel to the X-Y plane to form a first layer of the materials on the object platform; (b) moving the deposition sub-system and the platform away from each other by a predetermined layer thickness; and (c) after the portion of the first layer adjacent to a nozzle of the material deposition sub-system has solidified, dispensing a second layer of the materials (liquid droplets and powder particles) onto the first layer while simultaneously moving the platform and the deposition sub-system relative to one another in a direction parallel to the X-Y plane, whereby the second layer solidifies and adheres to the first layer.

A further preferred embodiment is a process as set forth in the above three steps, (1) through (3) plus (a), (b) and (c), further comprising additional steps of forming multiple layers of the materials on top of one another by repeated dispensing of droplets from the deposition device as the platform and the deposition sub-system are moved relative to one another in a direction parallel to the X-Y plane, with the deposition sub-system and the platform being moved away from one another in the Z-direction by a predetermined layer thickness after each preceding layer has been formed, and with the dispensing of each successive layer being controlled to take place after the material in the preceding layer immediately adjacent the nozzle has substantially solidified. These steps can be accomplished by operating the apparatus described above either manually or, preferably, under the control of a computer system.

Another preferred embodiment is a process as set forth in the above three steps, (1) through (3) plus (a), (b) and (c), further comprising the steps of (4) creating an image of the three-dimensional object on a computer with the image including a plurality of segments defining the object; (6) generating programmed signals corresponding to each of these segments in a predetermined sequence; and (7) moving the deposition sub-system and the platform relative to one another in response to the programmed signals. These additional steps provide computerized control over the relative motions between the deposition sub-system and the platform to build a 3-D object. However, the color pattern of an object is not necessarily predetermined. The adjustments of colors for different portions of an object can be made at any time during the object building process or in a random fashion, if so desired.

If a predetermined color pattern is desired before the object building process begins, then this pattern may be defined by attaching a color code to each of the constituent segments defining the object. When the computer reads a specific code, during the object building process, it will send out proper control signals to select the correct channels for ejecting droplets of selected colorants. Therefore, another embodiment of the present invention is a process as set forth in the above three steps, (1) through (3), but further comprising the steps of (d) creating an image of the object on a computer with the image including a plurality of segments defining the object and with each of the segments being coded with a color defined by the operation of a specific set of selected channels; (e) generating programmed signals corresponding to each of these segments in a predetermined sequence; (f) operating the pulse generator (actuator means) in response to the programmed signals to activate selected channels; and (g) moving the deposition sub-system and the platform relative to one another in response to the programmed signals.

As indicated earlier, the most popular file format used by all commercial rapid prototyping machines is the .STL format. The .STL file format describes a CAD model's surface topology as a single surface represented by triangular facets. By slicing through the CAD model simulated by these triangles, one would obtain coordinate points that define the boundaries of each cross section. It is therefore convenient for a dispensing nozzle to follow these coordinate points to trace out the perimeters of a layer cross section. These perimeters may be built with a proper color pattern and, since the exterior colors are normally what a person sees, the color patterns of the perimeters of constituent layer cross sections are normally more important than those of the interior of an object. These considerations have led to the development of another embodiment of the present invention. This is a process as set forth in the above-cited three steps, (1) through (3), wherein the moving step includes the step of moving the deposition device and the platform relative to one another in a direction parallel to the X-Y plane according to a first predetermined pattern to form an outer boundary of one selected color or one desired color pattern onto the platform. The outer boundary defines an exterior surface of the object.

Another embodiment is a process as set forth in the above paragraph, wherein the outer boundary defines an interior space in the object, and the moving step further includes the step of moving the deposition sub-system and the platform relative to one another in one direction parallel to the X-Y plane according to at least one other predetermined pattern to fill this interior space with a mixture of liquid compositions and powder materials. The interior does not have to have the same color or material composition as the exterior boundary. The interior space may be built with materials of a spatially controlled composition comprising one or more distinct types of materials. The powder particles may be deposited in continuously varying concentrations of distinct types of materials. This process may further comprise the steps of (h) creating an image of the object on a computer with the image including a plurality of segments defining the object; and (i) generating program signals corresponding to each of these segments in a predetermined sequence, wherein the program signals determine the movement of the deposition sub-system and the platform relative to one another in the first predetermined pattern and at least one other predetermined pattern.

The above procedures of delineating a boundary of a cross section and filling in the interior space of the cross section may be automated by using a computer system. This can be achieved by following the following steps: (j) creating an image of the object on a computer with the image including a plurality of segments defining the object; (k) generating program signals corresponding to each of the segments in a predetermined sequence; (l) activating at least one liquid droplet-ejecting channel and the powder dispensing device to deposit mixtures of liquid and solid materials at predetermined proportions onto the surface where a layer is being made; and (n) during this dispensing step, moving the deposition sub-system and the object-supporting platform in response to the programmed signals relative to one another in the X-Y plane and in the Z-direction in a predetermined sequence of movements such that the liquid droplets and powder particles are dispensed in free space as a plurality of segments sequentially formed so that the last dispensed segment overlies at least a portion of the preceding segment in contact therewith to thereby form the object.

In the above-cited processes, there may be provided at least three compositions containing yellow, magenta, and cyan, respectively. More preferably, there may be provided at least five compositions containing black, white, yellow, magenta, and cyan colorants, respectively.

In summary, a process for making a colorful three-dimensional object has been developed. In its broadest embodiment, but still being embraced within the present invention, such a process comprises the steps of (A) creating an image of a three-dimensional object on a computer with the image including a plurality of segments defining this object and each segment being coded with a color; (B) evaluating the data files representing the object to locate any un-supported feature of the object, followed by defining a support structure for the un-supported feature and creating a plurality of segments defining the support structure; (C) generating program signals corresponding to each of these constituent segments for both the object being built and the support structure in a predetermined sequence; (D) providing at least two colorant-containing liquid compositions for the object and one composition for the support structure; (E) feeding the compositions to at least one liquid deposition channel; (F) ejecting liquid composition droplets from the dispensing channels and dispensing powder particles onto desired spots of a surface on which an object is being built; (G) during this dispensing step, moving the deposition sub-system and the platform in response to the programmed signals relative to one another in the X-Y plane and in the Z-direction in a predetermined sequence of movements such that the droplets and powder are deposited in free space as a plurality of segments sequentially formed so that the last dispensed segment overlies at least a portion of the preceding segment in contact therewith to thereby form the support structure and the three-dimensional object.

This last step (G), for instance, may include first building a first portion of a first layer with a baseline body-building material containing a first selected color and/or material composition. A second portion of this first layer is then built possibly with a material composition containing a different color and/or different powder particles. The colors of individual portions are determined by their respective color codes. Material compositions are also included in their mathematical representation data packages. These procedures are repeated until the first layer is completed. A second layer, either single- or multiple-colored as desired, is then built by following a similar set of procedures. The procedures are continued until multiple layers, with each layer possibly having a different color form, are completed to build a colorful object. Clearly, the apparatus as herein specified can be adapted to readily accomplish the above procedures.

What is claimed:

1. A solid freeform fabrication process for making a three-dimensional object comprising the steps of:

operating a material deposition sub-system comprising a multiple-channel liquid droplet deposition device for supplying multiple liquid compositions and ejecting said liquid compositions in the form of droplets on demand and a solid powder-dispensing device for discharging powder particles to predetermined locations;

providing an object-supporting platform in close working proximity to said material deposition sub-system to receive said liquid droplets and powder particles therefrom;

during said material deposition process, moving said deposition sub-system and said object platform relative to one another in a plane defined by first and second directions and in a third direction orthogonal to said plane to form said liquid droplets and powder particles into a three dimensional shape.

2. A process as set forth in claim 1, wherein the moving step includes the steps of:

moving said deposition sub-system and said platform relative to one another in a direction parallel to said plane to form a first layer of said liquid droplets and powder particles on said platform;

moving said material deposition sub-system and said platform away from one another in said third direction by a predetermined layer thickness; and after the portion of said first layer adjacent to said deposition sub-system has substantially solidified, dispensing a second layer of said droplets and particles onto said first layer while simultaneously moving said platform and said deposition sub-system relative to one another in a direction parallel to said plane, whereby said second layer solidifies and adheres to said first layer.

3. A process as set forth in claim 2, comprising additional steps of forming multiple layers of said liquid droplets and solid powder particles on top of one another by repeated dispensing and depositing of said liquid and solid compositions from said deposition sub-system as said platform and said deposition sub-system are moved relative to one another in a direction parallel to said plane, with said deposition sub-system and said platform being moved away from one another in said third direction by a predetermined layer thickness after each preceding layer has been formed and with the depositing of each successive layer being controlled to take place after said deposited liquid compositions in the preceding layer immediately adjacent said deposition sub-system have substantially solidified.

4. A process as set forth in claim 1, further comprising the steps of:

creating an image of said three-dimensional object on a computer with said image including a plurality of segments defining the object;

generating programmed signals corresponding to each of said segments in a predetermined sequence; and moving said deposition sub-system and said platform relative to each other in response to said programmed signals.

5. A process as set forth in claim 1, further comprising the steps of:

creating an image of said three-dimensional object on a computer with said image including a plurality of segments defining the object; each of said segments being coded with a color;

generating programmed signals corresponding to each of said segments in a predetermined sequence;

operating said material deposition sub-system in response to said programmed signals to selectively dispense and deposit said powder particles and said liquid droplet compositions containing desired colorants at predetermined proportions;

moving said deposition sub-system and said platform relative to one another in response to said programmed signals.

6. A process as set forth in claim 1, wherein said moving step includes the step of moving said deposition sub-system and said platform relative to one another in a direction parallel to said plane according to a first predetermined pattern to form an outer boundary from at least one of said liquid compositions containing a desired colorant on said platform, said outer boundary defining an exterior surface of said object.

7. A process as set forth in claim 6, wherein said outer boundary defines an interior space in said object, and said moving step further includes the step of moving said deposition sub-system and said platform relative to one another in one direction parallel to said plane according to at least one other predetermined pattern to fill said interior space with said liquid droplets and powder particles.

8. A process as set forth in claim 7, further comprising the steps of:

creating an image of said three-dimensional object on a computer, said image including a plurality of segments defining said object; and generating program signals corresponding to each of said segments in a predetermined sequence, wherein said program signals determine said movement of said deposition sub-system and said platform relative to one another in said first predetermined pattern and said at least one other predetermined pattern.

9. A process as set forth in claim 7, wherein said interior space is deposited with a spatially controlled material composition comprising one or more distinct types of materials.

10. A process as set forth in claim 9, wherein said interior space is deposited with a material composition in continuously varying concentrations of distinct materials in three-dimensional part space to form a spatially controlled material composition part.

11. A process as set forth in claim 9, wherein said distinct types of materials are deposited at discrete locations in three-dimensional part space to form a spatially controlled material composition part.

12. A process as set forth in claim 1, further comprising:

using dimension sensor means to periodically measure dimensions of the object being built;

using a computer to determine the thickness and outline of individual layers of said liquid compositions and powder particles deposited in accordance with a computer aided design representation of said object; said computer being operated to calculate a first set of logical layers with specific thickness and outline for each layer and then periodically re-calculate another set of logical layers after comparing the dimension data acquired by said sensor means with said computer aided design representation in an adaptive manner.

13. A process as set forth in claim 1, wherein at least one liquid composition contains yellow dye, a second composition contains magenta, and a third composition contains cyan.

14. A process as set forth in claim 1, wherein at least one liquid composition contains white colorant and another contains black colorant.

15. A process for making a colorful three-dimensional object, comprising the steps of:

creating an image of said three-dimensional object on a computer, said image including a plurality of segments defining said object;

evaluating the data files representing said object to locate any un-supported feature of the object, followed by defining a support structure for the un-supported feature and creating a plurality of segments defining said support structure;

generating program signals corresponding to each of said segments for both said object and said support structure in a predetermined sequence;

providing colorant-containing liquid compositions and powder particles for said object and said support structure;

using a material deposition sub-system to deposit said liquid compositions and powder particles onto an object-supporting platform;

during said deposition step, moving said deposition sub-system and said object-supporting platform in response to said programmed signals relative to one another in a plane defined by first and second directions and in a third direction orthogonal to said plane in a predetermined sequence of movements such that said material compositions are deposited in free space as a plurality of segments sequentially formed so that the last deposited segment overlies at least a portion of the preceding segment in contact therewith to thereby form said support structure and said three-dimensional object.

16. A process for making a colorful three-dimensional object, comprising the steps of:

creating an image of said three-dimensional object on a computer, said image including a plurality of segments defining said object; each of said segments being coded with a color;

evaluating the data files representing said object to locate any un-supported feature of the object, followed by defining a support structure for the un-supported feature and creating a plurality of segments defining said support structure;

generating program signals corresponding to each of said segments for both said object and said support structure in a predetermined sequence;

providing colorant-containing liquid compositions and solid powder particles at predetermined proportions for said object and said support structure;

operating a material deposition sub-system to dispense and deposit droplets of said liquid compositions and said powder particles onto an object-supporting platform;

during said deposition step, moving said deposition subsystem and said object-supporting platform in response to said programmed signals relative to one another in a plane defined by first and second directions and in a third direction orthogonal to said plane in a predetermined sequence of movements such that said material compositions are deposited in free space as a plurality of segments sequentially formed so that the last deposited segment overlies at least a portion of the preceding segment in contact therewith to thereby form said support structure and said multi-color three-dimensional object.

17. A process as set forth in claim 16, wherein at least one of said multiple channels is supplied with a liquid composition comprising wax for building said support structure.

18. A layer-wise process of producing separate parts of a solid object comprising:

providing an object-supporting platform;

positioning a material deposition sub-system in close working proximity to said platform;

operating said deposition sub-system to deposit selected materials onto said platform, said deposition step comprising operating a multiple-channel liquid droplet deposition device of said sub-system for supplying and ejecting multiple liquid compositions in the form of droplets on demand and operating a powder-dispensing device of said sub-system for supplying and discharging selected solid powder particles to predetermined locations on said platform;

during said material deposition process, moving said deposition sub-system and said object platform relative to one another in a plane defined by first and second directions to form a first layer of said liquid compositions and powder particles at predetermined proportions;

repeating said material deposition process while moving said deposition sub-system and said platform relative to each other in said plane and in a third direction orthogonal to said plane to form multiple layers of said liquid droplets and powder particles at predetermined proportions in a predetermined sequence in such a fashion that at least one pair of two adjacent layers of said multiple layers are not unified and the resulting three dimensional shape is composed of at least two un-unified stacks of said multiple layers.

19. A process as set forth in claim 18, wherein non-unification between said at least two adjacent layers is accomplished by placing a thin layer of unification-preventing substance at an interface between said two adjacent layers.

20. A process as set forth in claim 19, wherein said unification-preventing substance comprises wax.

21. A process for making a three-dimensional object of spatially tailored material compositions, comprising the steps of:

creating an image of said object on a computer, said image including a plurality of segments defining said object; each of said segments being coded with a specific material composition;

evaluating the data files representing said object to locate any un-supported feature of the object, followed by defining a support structure for the un-supported feature and creating a plurality of segments defining said support structure;

generating program signals corresponding to each of said segments for both said object and said support structure in a predetermined sequence;

providing liquid compositions and solid powder particles of predetermined material compositions at predetermined proportions for said object and said support structure;

operating a material deposition sub-system to dispense and deposit droplets of said liquid compositions and said powder particles onto an object-supporting platform;

during said deposition step, moving said deposition sub-system and said object-supporting platform in response to said programmed signals relative to one another in a plane defined by first and second directions and in a third direction orthogonal to said plane in a predetermined sequence of movements such that said material compositions are deposited in free space as a plurality of segments sequentially formed so that the last deposited segment overlies at least a portion of the preceding segment in contact therewith to thereby form said support structure and said multi-material three-dimensional object.

* * * * *